(12) United States Patent
Rousselle et al.

(10) Patent No.: US 10,769,230 B1
(45) Date of Patent: Sep. 8, 2020

(54) SYSTEMS AND METHODS FOR THE CREATION, UPDATE AND USE OF AN EVENT BASED SEARCH INDEX IN A NETWORKED COMPUTER ENVIRONMENT USING DISTRIBUTED AGENTS

(71) Applicant: INSIGHTSQUARED INC., Boston, MA (US)

(72) Inventors: Philip J. Rousselle, Austin, TX (US); James M. Davison, Austin, TX (US); Daniel T. Greff, Austin, TX (US)

(73) Assignee: INSIGHTSQUARED, INC., Boston, MA (US)

( * ) Notice: Subject to any disclaimer, the term of this patent is extended or adjusted under 35 U.S.C. 154(b) by 558 days.

(21) Appl. No.: 15/370,874

(22) Filed: Dec. 6, 2016

Related U.S. Application Data

(60) Provisional application No. 62/264,178, filed on Dec. 7, 2015.

(51) Int. Cl.
*G06F 16/90* (2019.01)
*G06F 16/955* (2019.01)
*G06F 16/951* (2019.01)

(52) U.S. Cl.
CPC ........ *G06F 16/9566* (2019.01); *G06F 16/951* (2019.01)

(58) Field of Classification Search
CPC .......................... G06F 16/9566; G06F 16/951
See application file for complete search history.

(56) References Cited

U.S. PATENT DOCUMENTS

| | | | | |
|---|---|---|---|---|
| 2006/0224587 | A1* | 10/2006 | Zamir | G06F 16/9535 |
| 2012/0059801 | A1* | 3/2012 | Eagan | H04L 67/02 |
| | | | | 707/673 |
| 2015/0112995 | A1* | 4/2015 | Elyada | H04W 4/21 |
| | | | | 707/738 |

* cited by examiner

*Primary Examiner* — Kristopher Andersen
(74) *Attorney, Agent, or Firm* — Erik A. Huestis; Foley Hoag LLP

(57) ABSTRACT

Embodiments of an event based search system utilizing an event based search index are disclosed. These events may be associated with user interaction with content such that the search index is reflective of content with which users have interacted. The event based search index can be constructed utilizing agents distributed across users' devices within an enterprise. An agent on a user's device may be configured to monitor user interactions with content across a variety of resources and generate events based on these interactions. These events are provided to the search system to create the search index. The search results returned by these search systems are based on these events and thus are also reflective of user interactions with the content. Moreover, as different events may be created for multiple users' interactions with content, the events may be reflective of the importance of content within an enterprise.

20 Claims, 15 Drawing Sheets

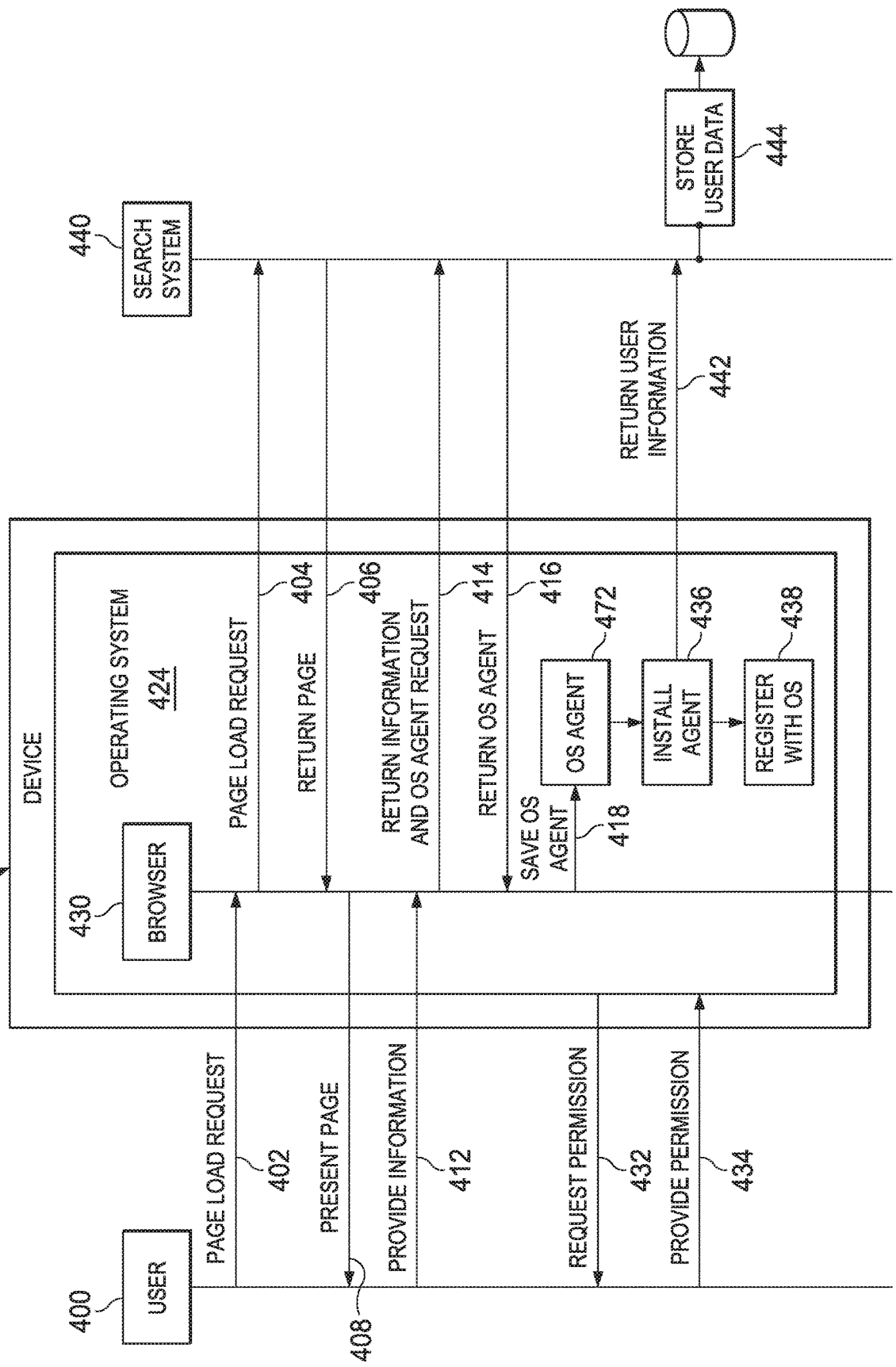

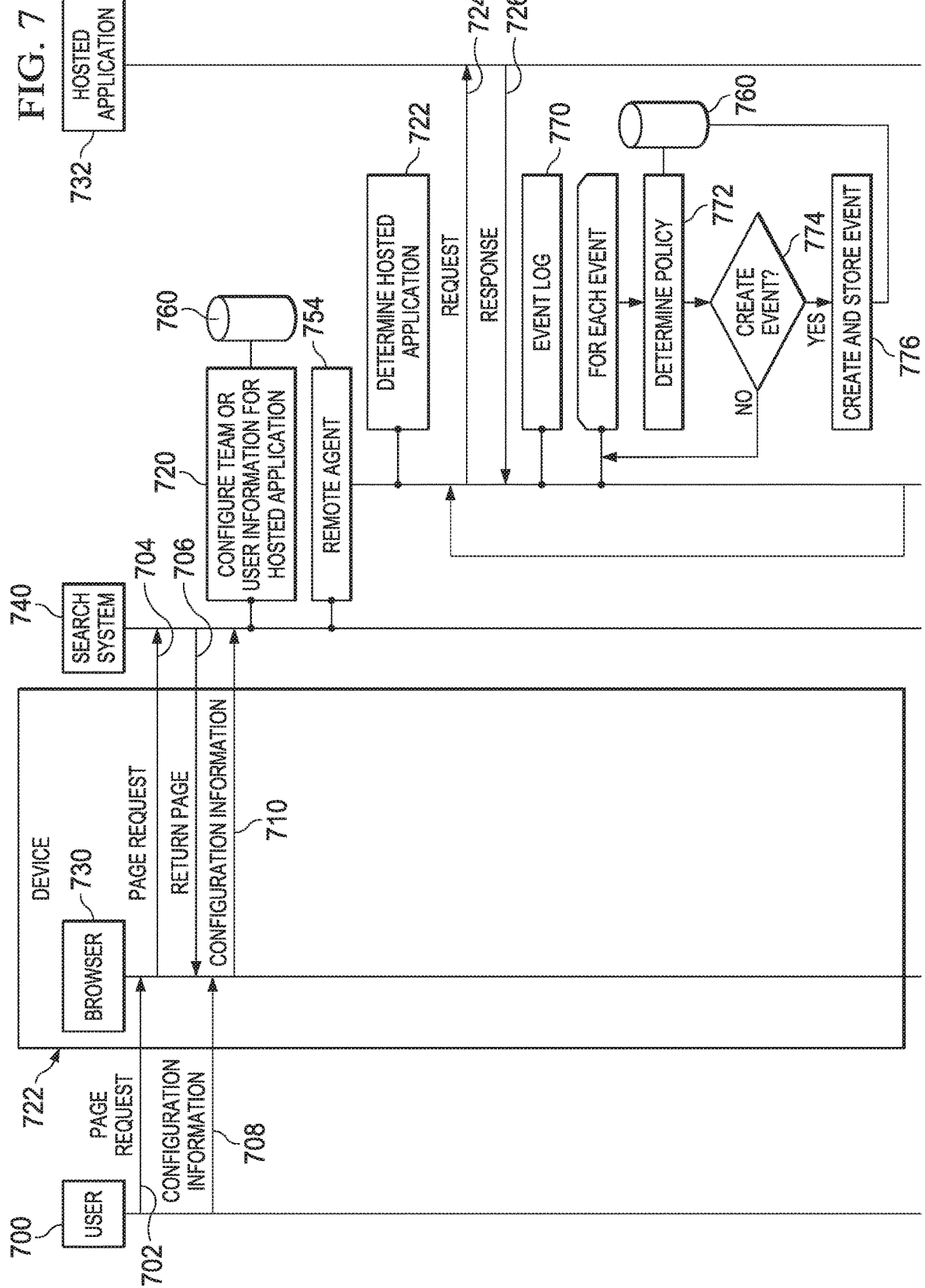

FIG. 13

SYSTEMS AND METHODS FOR THE CREATION, UPDATE AND USE OF AN EVENT BASED SEARCH INDEX IN A NETWORKED COMPUTER ENVIRONMENT USING DISTRIBUTED AGENTS

RELATED APPLICATIONS

This application claims priority under 35 U.S.C. § 119 to U.S. Provisional Application No. 62/264,178, entitled "Systems and Methods for the Creation, Update and Use of a Search Index of Data in a Networked Computer Environment Using Distributed Agents," filed Dec. 7, 2015, which is hereby fully incorporated by reference herein for all purposes.

TECHNICAL FIELD

This disclosure relates generally to improved systems and methods for event collection and event based analysis and search of content. In particular, embodiments relate to event creation and update of an event based search index of content in distributed networked computer environments. Even more specifically, embodiments relate to rule based event creation, and the update and use of an event based search index in a networked computer environment utilizing distributed agents.

BACKGROUND

In a modern computerized enterprise environment, workers or other users require content from a wide variety of both public and internal resources. In particular, many tasks require access to information contained in content on internal resources, like an intranet, or external resources such as publicly available resources like Wikipedia. A worker today is thus required to remember, or document, the location and type of content in each of the resources to which they have access. To accomplish a task requiring multiple pieces of content from different resources, a worker must locate all the resources containing the content and search all content in each resource to find the information they need. In many cases, the worker cannot complete a task if they cannot locate the content containing the required information and then successfully extract the information from the resource.

As an example, a customer support ticket might be created in a web based support ticket system, and the account details might be stored in a network based file share and a customer relationship management system. Processing the ticket and responding to a customer requires a worker to know the location of all three resources, and how to search and extract the information from each computer system.

This problem is further compounded by the number of resources in a modern enterprise and the amount of information in each system. Most data in a resource is irrelevant to the worker's tasks or jobs and makes the task of finding their required information more complicated. In the previous example, a customer support representative may need to sift through information on a network based file share that is only relevant to a sales team. Workers must find thousands of pieces of content in dozens of repositories in a very time consuming process that often ends up with the worker unable to locate desired content and having to re-create pre-existing content.

Currently then, a worker in an enterprise cannot easily locate all the content they may need from multiple internal or external resources to complete their tasks. These problems are symptomatic of a larger problem that almost all users within enterprise computing environments encounter. Namely, while there are a number of solutions that provide search capabilities to a user, these search systems are inadequate for a variety of reasons. In particular, these search systems may index some accessible content into a search index that the user can search across the given systems. However, the existing solutions that create such indices only serve to complicate the problems associated with the search content across distributed resources because they do not comprehensively cover these resources, or all relevant content on the resource, and thus add yet another resource to an ever-growing list of information locations any given worker must search. This situation exists at least in part because a user may be under the misimpression that such a search system covers all content in all pertinent resources and may not seek out other resources or content.

In addition, these search solutions have other common weaknesses. Specifically, in most cases, these search systems require direct access to the resource to index content of those resources and they index all content on the resource by crawling and processing the content.

The requirement of integrating search systems with resources so that these search systems have direct access to those resources creates many challenges. To create an index of content for search, the search systems require either authentication and authorization to use an interface that is an offered by the target system on which the content reside, or they require authentication and authorization for a "crawler" that visits content that can be accessed through the resource to create an index of that content for search. This type of configuration is beyond the skill set of most information technology (IT) teams.

In addition, only content from computer systems that have these types of integrations at all can be searched. If a resource does not offer such interfaces, the content for that resource may be inaccessible by search systems and thus may not be indexed and available for searching. Moreover, integrating with one resource does not typically reduce the amount of work required to integrate with any other resource. As the average company uses hundreds if not thousands of resources, this limitation is significant.

A search index built by "crawling" content is also limited. At least one reason for the limited usefulness of such indices is that an index built by processing the content is based upon the contents (e.g., the data or information) of the indexed content. Thus, a search system that utilizes an index of this type is confined to determining importance of content to users based on the contents of the indexed content. In particular, these search systems may be keyword based where the importance of content is determined based on the frequency of occurrence of search terms in the contents of the content. As may be imagined, this measure of content importance results in many irrelevant documents being returned as responsive to a search.

As an illustration, suppose a company has a product that it is has been producing for many years under the same name. A search for content based on the name of that product may result in many older documents containing the name of the product being returned in response to the search, as the measure of importance of the content is based on the index created from the contents of the content and the search is applied to all indexed content. This content may, however, be highly irrelevant to the user. The user must himself filter the search results based on the importance of the returned documents to him.

While certain search systems may utilize a variety of techniques to mitigate the effect of a content based search index, these techniques have proven inadequate in addressing the base problems inherent in utilizing such a content-based index for search systems. Specifically, these techniques fail to ameliorate the problem that the contents of a document are a poor proxy for the importance of that document to a user. The problems inherent in such search systems are also exacerbated by the fact that the measure of importance of content is determined in the same manner (based on the contents based index) regardless of the user.

Accordingly, current search systems are difficult to implement and deploy, are capable of indexing and searching only a small fraction of the resources available to an enterprise and, even amongst that subset of resources, often provide highly irrelevant results to a user. What is desired, then, are improved search systems.

SUMMARY

To at least that end, embodiments as disclosed herein provide an event based search system that utilizes a search index created based on events. These events may be associated with user interaction with content such that the search index is reflective of content with which users have interacted. The search results returned by these search systems utilizing such a search index are based on these events and thus are also reflective of user interactions with the searched content. Moreover, as different events may be created for multiple users' interactions with content, the events may be reflective of the importance of content within an enterprise.

In particular, in certain embodiments, such an event based search index can be constructed utilizing agents distributed across user's devices within an enterprise. An agent on a user device may be configured to monitor user interactions with content across a variety of resources and generate events based on these interactions. These events can be provided to the search system where they may be used to create the search index.

These agents may include a browser based agent or an operating system based agent. A browser based agent can be configured to create events based on user interactions with resources providing web based or other content accessed through a web browser. An operating system based agent can be configured to create events based on user interactions with content through resources such as applications executing on the user's device or other resources using the operating system of the user's device. These events may be generated by agents based on policies associated with at least a portion of a path by which the content associated with the event may be accessed. The policies may include one or more rules that can be evaluated both to determine if an event should be generated based on a user interaction and, if so, what data should be collected for the event.

These events allow embodiments of a search system to base the determination of the importance of content relative to a search on information other than the contents of the document themselves. Using these events the determination of importance for content may be based on, for example: frequency of interaction of the searching user or a group of users within an enterprise (including across all monitored users of an enterprise) with content, the distribution of users' interactions with content, recency of the searching user's (or group of users within an enterprise) interaction with content, type of interaction with content, etc. Moreover, these measures of importance can be determined relative to a searching user himself, or across groups of users within an enterprise environment (including all monitored users of an enterprise). The search results returned by embodiments of such search systems are thus directly based on user interaction with content.

Embodiments of the search systems as disclosed herein may provide a number of advantages. Importantly, no actual processing of the contents of content is required to create a search index. By alleviating the need to actually process the contents of content to create a search index, there is no need to obtain and communicate such content to a search system; no need to store such content at a search system; and no need to devote computing resources to the processing of the contents of such content to create a search index. Thus, the speed of such search system is improved as there is no need to obtain or communicate the content between any content source and search system or to devote computing resources to processing the content to create a search index. Additionally, the storage requirements of search systems are likewise improved as there is no need to devote storage resources to the storage of content, either for long term maintenance of such content or while the content is being processed for creation of a search index.

Moreover, in addition to the improvements in speed and storage usage for such search systems, because such search systems are based on events, such search systems may provide improved search results (e.g., more relevant to a user). In particular, the use of agents installed on computing devices allows the unobtrusive gathering of very detailed information about what content a user or group of users are accessing. By creating a search index based on what users actually access, embodiments allow for the creation of a search index for only that content which a user (or a user within an associated group) has accessed. As such, when a user creates a search, only content associated with the user's (or group's) accesses may be searched. By confining the search to only content having an associated event the results produced are made more relevant to the user.

Embodiments as disclosed may also require far fewer integration points compared to prior art which requires direct connections or integrations to resources. There can be thousands of different resources in a modern enterprise. By building a search index based on monitoring user activity, embodiments allow for a search index to be created by creating an integration with computing devices on which the user views data.

Building a search index in this way has several advantages, such as: resources that might be overlooked by a "crawler" are discovered as they are created or used; no preference may be given to internally or externally available resources; and (as detailed above) only data relevant to a population of users may be indexed. Embodiments can thus achieve substantially comprehensive visibility into content accessed across almost all resources accessed by a group of users with a small number of integrations (e.g., agents on computing devices).

In certain embodiments, therefore, a search system may comprise a server computer coupled to a plurality of user computer devices of a team over a network, the server computer including a data store including an event based search index; a processor; and a non-transitory computer readable medium comprising instructions executable on the processor. A search system executing such instructions may receive an event from an agent resident on a user computing device, the event associated with a user interaction with a content item at the user computing device, wherein the content item is accessible by the user at a Uniform Resource Locator (URL) included in the event. The search system may store an event object representing the event in association with a content object representing the content item in the event based search index of the data store at the search system. The event object may be associated with a user identifier for the user while the content object includes the URL of the content item and is associated with a team object representing the team associated with the user.

Embodiments of the search system may receive a search from the user and access the event based search index to determine a set of content objects, where each of the set of content objects has at least one associated event object that is associated with the user. The content objects can be scored based on the at least one associated event objects, ranked based on the score associated with each content object and a result set of content objects selected from the ranked set of content objects. Search results to be presented to the user can be formed, wherein the search results include the URLs for each of the result set of content objects and these search results to the user at the user device.

In one embodiment, the agent may be a browser agent installed on a browser on the user's computing device where the browser agent receives a browser event from the browser when the user interacts with the content item at the URL and the browser agent sends the event to the search system.

Similarly, in one embodiment, the agent may be an operating system agent installed on an operating system on the user's computing device where the operating system agent receives an operating system event from the operating system when the user interacts with the content item at the URL and the operating system agent sends the event to the search system.

In other embodiments, receiving an event at the search system includes receiving a policy request from the agent, the policy request including a domain portion of the URL and determining one or more policy objects associated with the team object or application object in the data store of the search system based on the domain portion. Each of the policy objects may include a URL pattern for matching against the URL of the content item. These policy objects may be returned to the agent so the agent can evaluate the policy objects to create the event. In a particular embodiment, the domain portion of the URL comprises a path or a folder.

In another embodiment, the search system may score each of the set of content objects based on one or more of: frequency of user access, recency of user access, frequency of team access or recency of team access. In yet other embodiments, the set of content objects associated with at least one event to which the user has access.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 4 depicts a flow diagram of one embodiment of the installation of an agent on a user device.

FIG. 7 depicts a flow diagram of one embodiment of the updating of an event based search index using an agent on a search system.

FIG. 13 depicts one embodiment of an interface by which search results may be presented to a user.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, it will be helpful to remember the context described above. To summarize, the effective search of content from various resources of an enterprise is highly desirable. Specifically, given the problems with existing search systems it is desired to enable users within enterprises to effectively search content from various resources and in particular search the content actually accessed by users within and across resources of that enterprise.

To those ends, among others, embodiments as disclosed herein provide an event based search system that utilizes a search index created based on events. These events are associated with user interaction with content such that the search index of the search system is reflective of content with which users have interacted. When the search system receives a search, the search results are determined using the event based search index. The returned search results are thus also reflective of user interactions with the searched content and, as such, are more relevant to the user.

Figure 1:
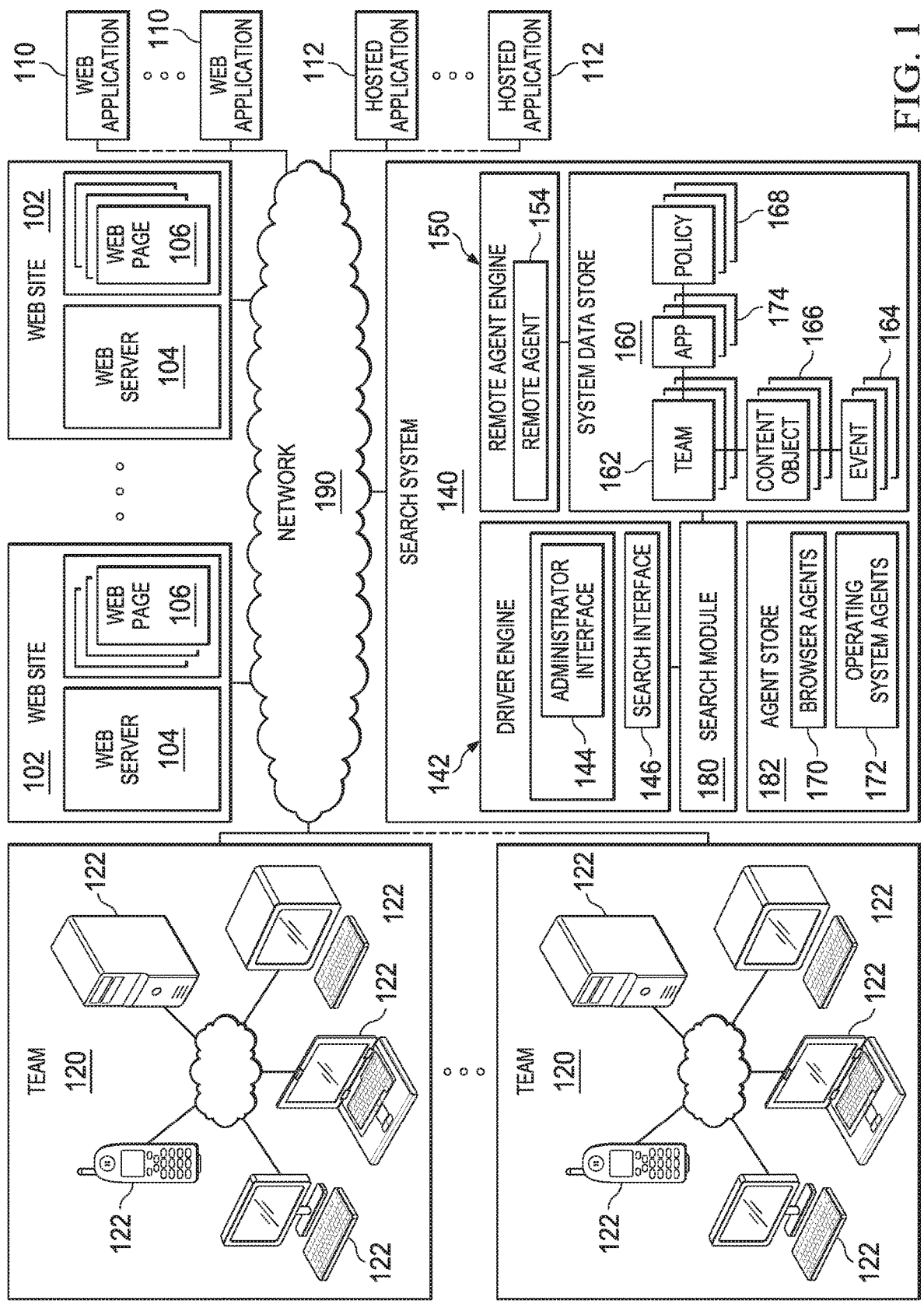
FIG. 1 depicts a diagrammatic representation of a network environment including one embodiment of a search system.

Turning now to FIG. 1, a block diagram of a distributed computer network environment, including an embodiment of a search system, is depicted. Search system 140 is coupled through network 190 to teams 120, web sites 102, web applications 110 and hosted applications 112. Network 190 is a computer based network or combination of computer based network such as the Internet, an intranet, a Wide Area Network (WAN) and Local Area Network (LAN), a cellular network, or almost any wireless or wired network.

A team (also referred to herein as enterprise) 120 may be a company, organization, business, non-profit, concern, or other entity and includes an associated group of computer devices 122 through which users associated with the team 120 can access content provided by resources. These resources may include internally available resources such as applications executing on the user's device 122 or on another computer device (e.g., a server) associated with the team 120. A user at a computing device 122 may, for example, use an application executing on the computer device 122 to access content locally resident on the file system of the device 122 or provided by, for example, a file server or email server of the team 120.

The resources may also include external or publicly available resources. For example, a user may use an application such as a web browser to access content such as web pages 106 provided from a web server 104 operating a web site 102 or content from a web application 110. An application at the user device 122 may also be associated with a hosted application 112 operating at remote location such that the user may use the application to access content provided by the hosted application 112. Examples of such web applications 110 or hosted application may be web based email systems such as Gmail or Yahoo, or certain applications like Salesforce, etc.

A content item or single piece of content (also referred to herein as a document) from, or accessed through, one of these resources may be thought of as a discrete set of electronic data. Such content may be an electronic file or portion thereof in a proprietary format such as those used by particular applications, including for example: an Exchange file, (e.g., a .pst file), Portable Document Format (.pdf), a PowerPoint file (.ppt file), a Word file (e.g., .doc); or a non-proprietary format such as a text file (e.g., a .txt file), a HyperText Markup Language (e.g., HTML) file, a webpage file (e.g., .asp, .jsp), an eXtensible Markup Language (XML) file, an image file (e.g., .gif or .jpg), a source code file (e.g., .c, .java, etc.), an executable format (e.g., .exe, etc.), a multimedia format (e.g., .mp3, .mp4, .mpeg, .mov, etc.) or the like. Other types of file formats and files are possible and fully contemplated herein.

A content item may also comprise a discrete set of data even if it is not saved as a file, or not saved according to a particular file format. For example, a content item may include a set of data (e.g., a set of bytes or byte array, etc.) returned in response to a call or request (e.g., through an Application Programming Interface (API), a web services interface, etc.).

As can be seen then, the content items that are accessed at the various resources by users of team 120 may be quite varied. A user has little capability to track or manage content across these resources. This problem does not, however, keep users at teams 120 from needing to locate multiple content items from multiple different resources. A search system would be useful to facilitate this process.

As discussed above, however, most search system are inadequate for the task as they need to store and access content from these resources that are distributed across a network environment to create a contents based index. Moreover, search systems using such a contents based index are slow, inefficient and provide irrelevant results.

Search system 140 addresses these problems, among others, by utilizing a search index comprised of events associated with user interaction with content items. The content item themselves need not be processed or stored by the search system. Instead, the search system 140 may utilize agents installed on user's devices 122 to assemble a search index comprising events representing user interaction's with content items. The collection of events to form the search index is driven both by a user interaction and the resource from which the content item is obtained.

In particular, each content item from the various accessed resources is accessed at a particular location associated with that resource. Accordingly, each content item from every resource has a Uniform Resource Locator (URL) or Uniform Resource Identifier (URI) (collectively referred to as a URL herein) associated with it so that the content item is accessed by a user at a computer device 122 at the specified location. As used herein, this URL can include a domain or hostname and a path, as is typical of web based URLs, or may include just a path (e.g., a relative or absolute path) to a content item such as when a content item is accessed directly from a file system.

This URL can be leveraged by the search system 140 to assign structure to a content item (e.g., obtaining and assigning particular types or values of data to the content item or related events). This may be the case despite the fact that the contents of that content item are never stored on, or processed by, the search system 140, and that the content item itself may (or may not) comprise unstructured data.

The search system 140 utilize agents installed on user's devices 122 to assemble a search index comprising events representing user interaction's with content items. The collection of events by is driven both by a user interaction itself and the URL specifying the location of the content item (and thus associated with the resource itself).

The content items themselves may also be represented on the search system 140 using the URL. When a user conducts a search for relevant content, the search is evaluated using the events within the search index to determine relevant content items to return to the user. The URLs for the relevant content items can then be returned to the user as search results. The user who submitted the search can then directly access the relevant content items by interacting with the returned URL (e.g., clicking on a link) without involvement of the search system 140.

Accordingly, the search system 140 may include one or more agents that may be distributed and installed on user devices 122 for determining or reporting of events to the search system 140. In one embodiment, agent store 182 may include one or more browser agents 170 designed for use with a particular type of web browsers on computing devices 122, including for example, Chrome, Safari, Internet Explorer, Firefox, Opera, or the like. A browser based agent 170 is configured to report events occurring with respect to resources accessed through a browser in which it is installed.

In particular, one embodiment of a browser agent 170 may be configured to be installed as a plug-in to a web browser according to the browsers' extension architecture and be activated by a when a context of the browser is "true". This context can be, for example, "all URLs" such that every time a URL is accessed by the web browser on which the agent is installed the browser agent 170 will receive a browser event from the web browser with the accessed URL. The browser agent 170 can then determine if an event should be reported to the search system 140 based on the URL.

Operating system agents 172 are configured to, when installed on a user device 122, capture and report events occurring with respect to resources accessed through the operating system of the device 122, including for example a Windows based operating system or a Macintosh or Apple based operating system such as (OSX or iOS). Operating system agents 172 may be configured to work with other types of operating systems are possible and are contemplated herein.

One embodiment of an operating system agent 172 may be configured to be installed on an operating system and register with the operating system to receive operating system events associated with a URL or portion thereof, including particular paths or folders, or types of files. Thus, when operating system events (e.g., file system events) occur with respect to these URLs (e.g., paths or folders) or types of files these operating system events may be received by the operating system agent 172 installed on the device 122. The operating system agent 172 can then determine if an event should be reported to the search system 140 based on the operating system event.

There may however, be certain resources through which users of teams 122 access content where it may be difficult to collect events on through a browser based agent 170 or an operating system agent 172. These resources may include web applications 110 or hosted application through which a user may access a large number of content items through an interface that does not provide simple visibility into user interactions or otherwise does not allow these user interactions to be easily monitored. Examples of such web applications 110 or hosted applications 112 include Salesforce or web based email such as Gmail or Yahoo! Mail.

In such cases, user interaction events may often be obtained directly from the web application 110 or hosted application 112 using an interface (e.g., an API) offered by the web application 110 or hosted application 112. To obtain and process events from these types of resources the search system 140 may include a remote agent engine 150 executing a remote agent 154 at some time interval. The remote agent engine may be configured to access the web application 110 or hosted application using an offered API and obtain an event log for a user or a team 120. The remote agent 154 can then process these events to determine if an event should be stored on the search system 140 based on events in the obtained event log.

The search system 140 can store events generated by agents as event objects 164 in the system data store 160 to form an event based search index in association with content objects 166 representing the content items associated with the events. The system data store 160 may also include a variety of objects representing teams 120, resources through which content items may be accessed and policies that may be applied to determine events that occur with respect to content items. While a traditional relational database may be used for system data store 160, in one embodiment the system data store 160 may be a NoSQL data store such as a key-value store, a document store, a graph store, a tuple store, etc. In one embodiment, for example, the system data store 160 may be based on a data store provided by Lucene or Elasticsearch.

In particular, the system data store may include one or more team objects 162 representing a team 120. A team object 162 may be created by driver engine 142 based on a user's (e.g., an administrator associated with a team 120) interaction with an administrator interface 144 (e.g., presented over network 190 at the user's browser or a standalone application, etc.). The user may interact with the administrator interface 144 to define a name for the team 120 and provide other identifying, pertinent or desired information. The driver engine 142 can then create a unique identifier for that team 120 and create a team object 162 in the system data store 160 representing that team 120 and including the provided team information and the unique identifier for that team 120.

An app object 174 represents a resource through which content may be accessed by users or that is a repository of content. An app object 174 is thus associated with a corresponding team object 162 representing the team 120 whose users access content through the resource represented by the app object 174. An app object 174 is defined by its "rootDomain" which is a definition of a location at which content may be accessed for that resource. For example, for a web site (e.g., www.google.com) the rootDomain for the app object 174 representing that resource would be the domain name on the web (e.g., "google.com"). For resources accessed through the operating system at a user's device the rootDomain may be a folder (e.g., */MyDocuments). Additionally, there may be an app object 174 created for each user's device 122. In this case, the rootDomain may be a domain identifier created uniquely for that user's device that may include an identifier for the user or the user's device (e.g., userX-guid.laptop-client.guid).

These app objects 174 may be created by the driver engine 142 based on a definition of an "app" by a user associated with a team 120 interacting with the administrator interface 144; may be default app objects 174 created and assigned when a team object 162 is created by driver engine 142; or may be created and associated with the a team object 162 when an agent is installed on a user device 122 (e.g., to represent resource accessed at that user device).

A policy object 168 is a associated with an app object 174 and represents a policy defining whether and how to create events for content items whose URL matches a given URL pattern that includes the rootDomain of the app object 174 with which it is associated. One policy object 168 may be a global policy object 168 that defines a default behavior for the rootDomain if no other policy applies to a URL. A policy object 168 may thus include a URL Pattern to be evaluated against a URL of a content item. If the evaluation of the URL Pattern against the URL of a content item is true, the policy represented by that policy object is considered to apply to that content item. A null URL pattern may indicate that the represented policy applies to all URLs having the rootDomain of the associated app object 174.

A policy object 168 may also include a set of rules for defining how an event is to be created if the policy represented by the policy object 168 applies. In particular, these rules may indicate what data is to be obtained about, or from, the content item or the user interaction in order to generate an event according to that policy. These rules may include such rules as a title selector for selecting a title for the content item, a description selector for selecting a description of the event, a name selector, rules governing how to determine what a type of event has occurred and to obtain data based on the event type.

A content object 166 represents a particular content item at a location of a resource accessed by a user of a team 120, and may be associated with the team object 162 representing the team 120 that includes that user. The content object 166 can thus include the URL of the content item. Additionally, the content object 166 includes other identifying information such as a title, description, user identifier or team identifier associated with the content item.

An event object 164 represents an event (e.g., a user interaction) that occurred with respect to a particular content item and user of a particular team 120, and may be associated with the content object 166 representing that particular content item. User interactions may include for example, view, update, save, click, hide, send, or almost any other desired interaction that a user may take with respect to a content item. For example, if a single email to five people may generate six events, an event for the sending of the email and five email view events from each of the recipients.

Each event object 164 may thus include a user identifier, a team identifier, an application identifier for the app associated with the content item on which the user interaction occurred, an identifier for a content policy associated with the event object, an identification of an action type represented by the event and data pertaining to the type of event. This data may be extensible or determined based on the action type.

These event objects 164 form a search index that may be used by search system 140 to perform searches on content items represented by content objects 166. These events allow the search system 140 to base the determination of the importance of content relative to the search on information other than the contents of the document themselves including, for example, frequency of interaction of the searching user or a group of users within an team with content, the distribution of users' interactions with content, recency of interaction with content, type of interaction with content, etc.

Specifically, search module interface 146 allows a user at a user device 122 in a team 120 to submit a search to the search system 140. The search interface 146 may establish a context for the search, including the identity of the user and any query the user submits. The query may include a date or date range or one or more search terms. The context for the search may be passed to the search module 180, which conducts the search utilizing the search index comprising the event objects 166 contained in the system data store 160 and returns the results to the search interface 146. Search interface 146 can then present the results of the search to the user.

In particular, the search results contain a ranked list of content items represented by the URLS for those content items. The user who submitted the search can then directly access the relevant content items by interacting with the returned URL (e.g., clicking on a link) without further involvement of the search system 140.

Figure 2:
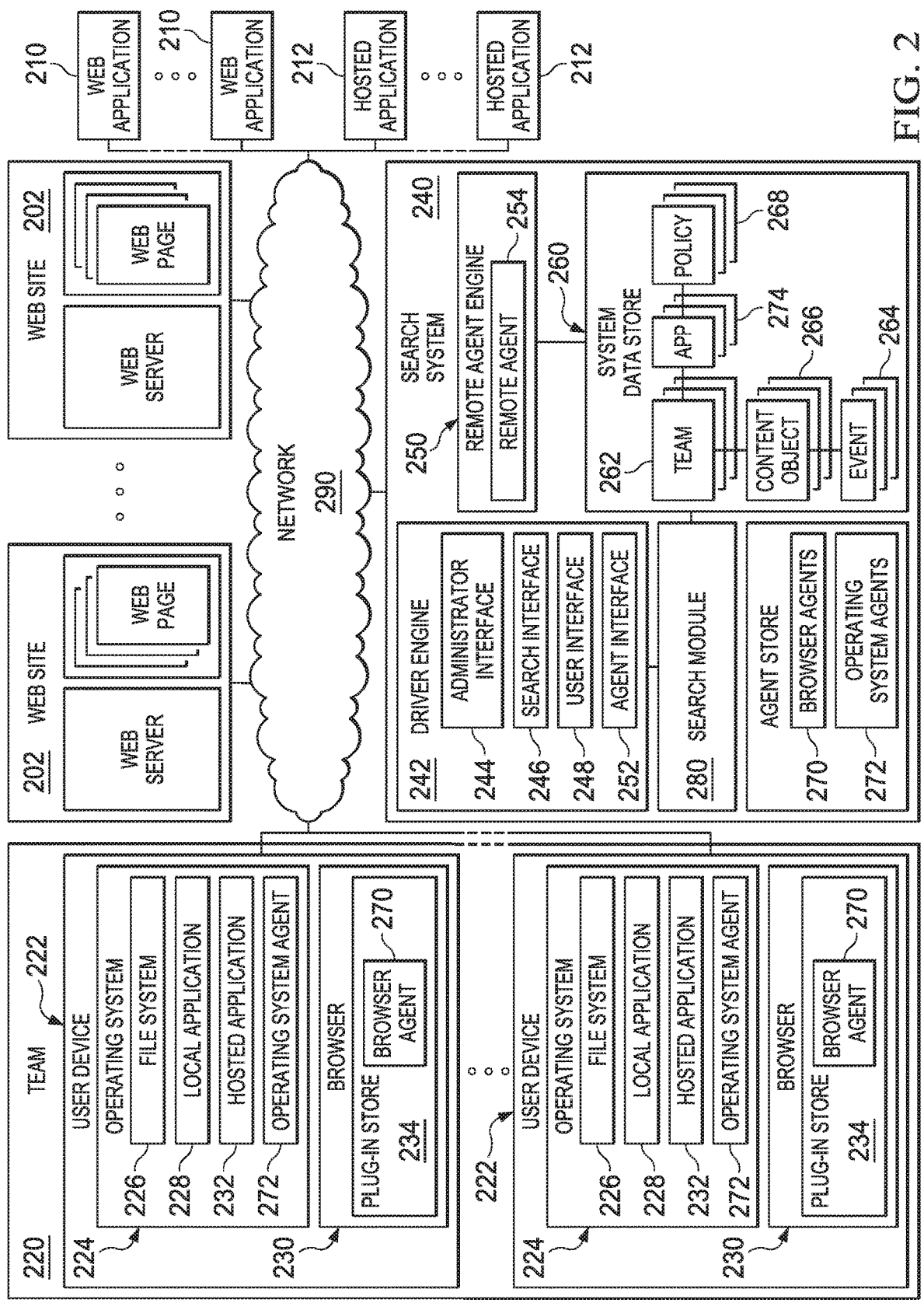
FIG. 2 depicts a diagrammatic representation of a network environment including one embodiment of a search system.

The installation and use of agents to report events to a search system may be better understood with respect to FIG. 2, which depicts a block diagram of a distributed computer network environment including an embodiment of a search system and associated agents installed at user devices of a team. A user such as an administrator or the like at the team 220 may wish to utilize search system 240. The user may interact with the administrator interface 244 to register their team 220 with the search system. This administrator interface 244 may be a web based application that presents one or more interfaces through web pages at a user's browser; may be an installed application on the user's device; may be a mobile application; or may be some other type of interface that allows a user to interact with the search system 240 over a computer network 290.

Using the administrator interface 244, then, the user of the team 220 may provide information on the team 220 to the search system 240, including, for example, defining a name for the team 220 and providing other identifying, pertinent or desired information. Driver engine 242 may use this information to create a unique identifier for the team 220 and create a team object 262 representing the team 220 in the system data store 260 including the provided team information and the unique identifier for that team 220.

The user at the team 220 (e.g., the administrator) may desire that users of the team 220 utilize the search system 240. Accordingly, user may provide links, emails, requests, etc. to the users of the team 220 to access the user interface 248 of the search system 240. The user interface 248 may be a web based application that presents one or more interfaces through web pages at a user's browser 230; may be an installed application on the user's device 222; may be a mobile application; or may be some other type of interface that allows a user to interact with the search system 240 over the computer network 290.

Figure 9:
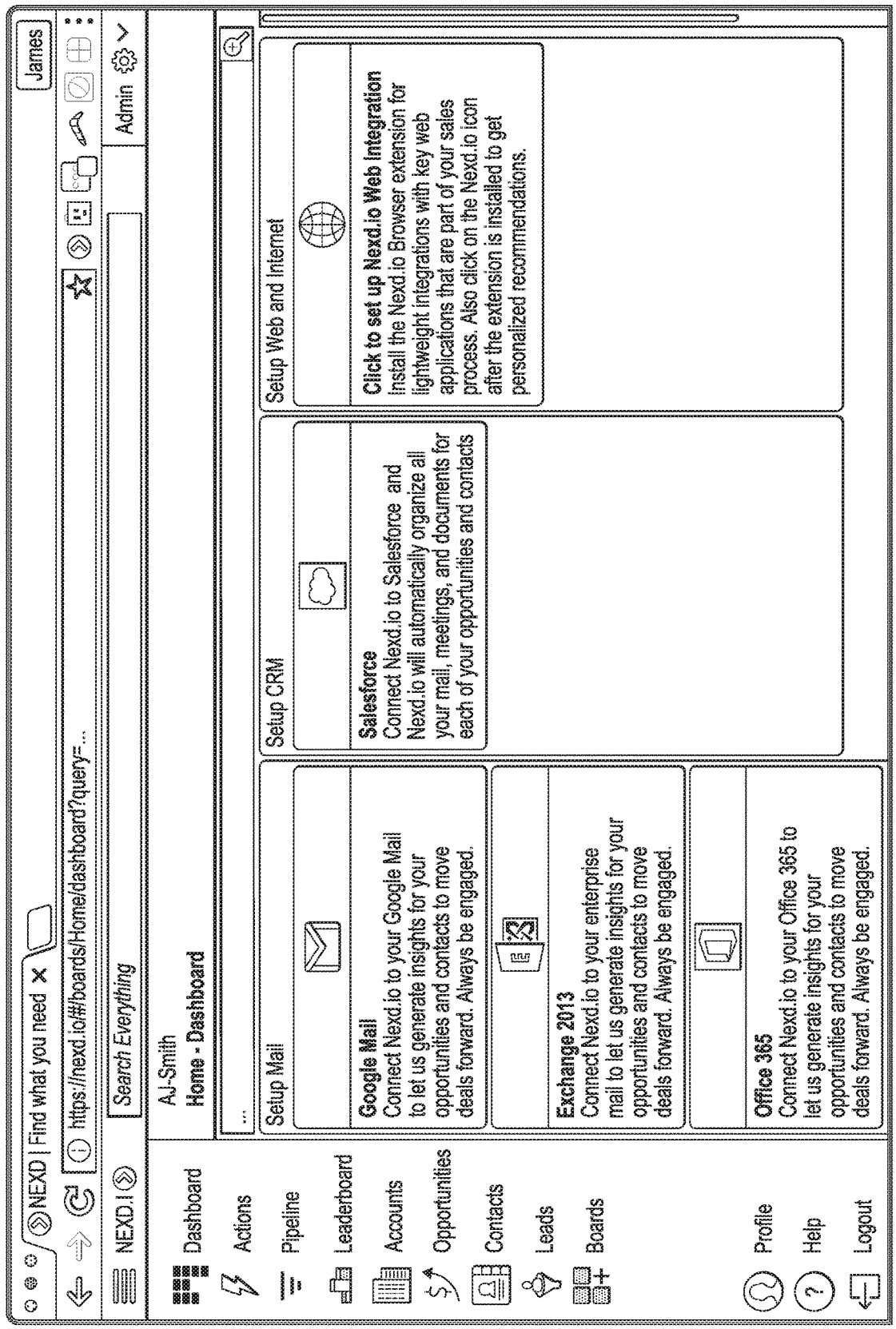
FIG. 9 depicts one embodiment of an interface by which a user may configure or install an agent.

A user at a user device 222 may thus access the user interface 248 of the search system 240 through the user interface 248. The user may provide access or download one or more agents to be installed on their user device 222 through the user interface 248. The user may also provide any required permissions for the installation of such agents, including permission requested through the user interface 248, the operating system 224 of their device 222 or the browser 230 on their device. One embodiment of an interface that may be utilized by users to install or configure agents is depicted in FIG. 9.

In one embodiment, the search system 240 may include one or more agents that may be distributed and installed on user devices 222 for determining or reporting of events to the search system 240. The user may utilize the user interface 248 to request or allow installation of a browser agents 270 designed for use with the particular type of web browser 230 on his computing devices 222, including for example, Chrome, Safari, Internet Explorer, Firefox, Opera, or the like. In one embodiment, the user interface 248 may automatically detect the type of browser 230 and initiate the download or installation of the appropriate browser agent 230.

In particular, one embodiment of a browser agent 270 may be configured to be installed as a plug-in to a web browser according to the browsers' extension architecture. The user may give any requested permissions requested by the browser 230 for installation of the browser agent 270, and the browser agent 230 can be installed in the plug-in store 234 of the browser 230. When the browser agent 270 is installed, it may generate or obtain a unique identifier for the user. This unique identifier can be reported back to the search system 240 through the driver engine 242 and stored in association with the team object 262 for team 220. Accordingly, the team object 262 for the team 220 can be associated with a set of unique identifiers for users at the team.

This identifier may be, for example, a numerical identifier, or may include an identifier for a user that is utilized by the user within the team 220 but may be unique to the user, such as the user's email address (where the combination of the username and domain make the identifier unique to the user both within the team 220 and across teams). The identifier may also be a combination of both a unique numerical identifier that may be unique with respect to the agent and that user and a team based unique identifier (e.g., email address). In this manner, events from a particular user reported from different agents across user devices 222 may be correlated to a particular user through the user of the team based unique identifier (e.g., email address), as will be discussed in more detail at a later point herein.

The browser based agent 270 is configured to report events occurring with respect to resources accessed through a browser in which it is installed. Specifically, in certain embodiments, the browser agent 270 may register with the browser 230 to be activated by a when a context of the browser is "true". This context can be, for example, "all URLs" such that every time a URL is accessed by the web browser 230 on which the agent 270 is installed the browser agent 270 will receive a browser event from the web browser with the accessed URL. The browser agent 270 can then determine if an event should be reported to the search system 140 based on the URL, and report an event to the search system if so.

The user may also utilize the user interface 248 to request or allow installation of an operating system agent 272 designed for use with a particular operating system 224 such as a Windows based operating system, OSX, iOS, etc. Operating system agents 272 may be configured to work with other types of operating systems are possible and are contemplated herein. In one embodiment, the user interface 248 may automatically detect the type of operating system 224 and initiate the download or installation of the appropriate operating system agent 272.

The user may give any requested permissions requested by the operating system 224 for installation of the operating system agent 272 (e.g., as when installing an .exe on Windows based operating system or .dmg in a OSX environment), and the operating system agent 272 can be installed on the user device 272 and register with the operating system 224. When the operating system agent 272 is installed, it may generate or obtain a unique identifier for the user as discussed above with respect to browser based agent 270. This unique identifier can be reported back to the search system 240 through the driver engine 242 and stored in association with the team object 262 for team 220.

In particular, one embodiment of an operating system agent 272 may be configured to be installed on an operating system 224 and register with the operating system 224 to receive operating system events associated with a URL or portion thereof (e.g. domain), including particular paths or folders, or types of files. Thus, when operating system events (e.g., events from a local application 228 or hosted application 232 utilizing file system 226 or other functionality of the operating system 224) occur with respect to these URLs (e.g., paths or folders) or types of files, these operating system events may be received by the operating system agent 272 installed on the device 222. Operating system agent 272 can, based on these operating system events, capture and report events occurring with respect to resources accessed through the operating system 224 of the device 222.

Figure 3:
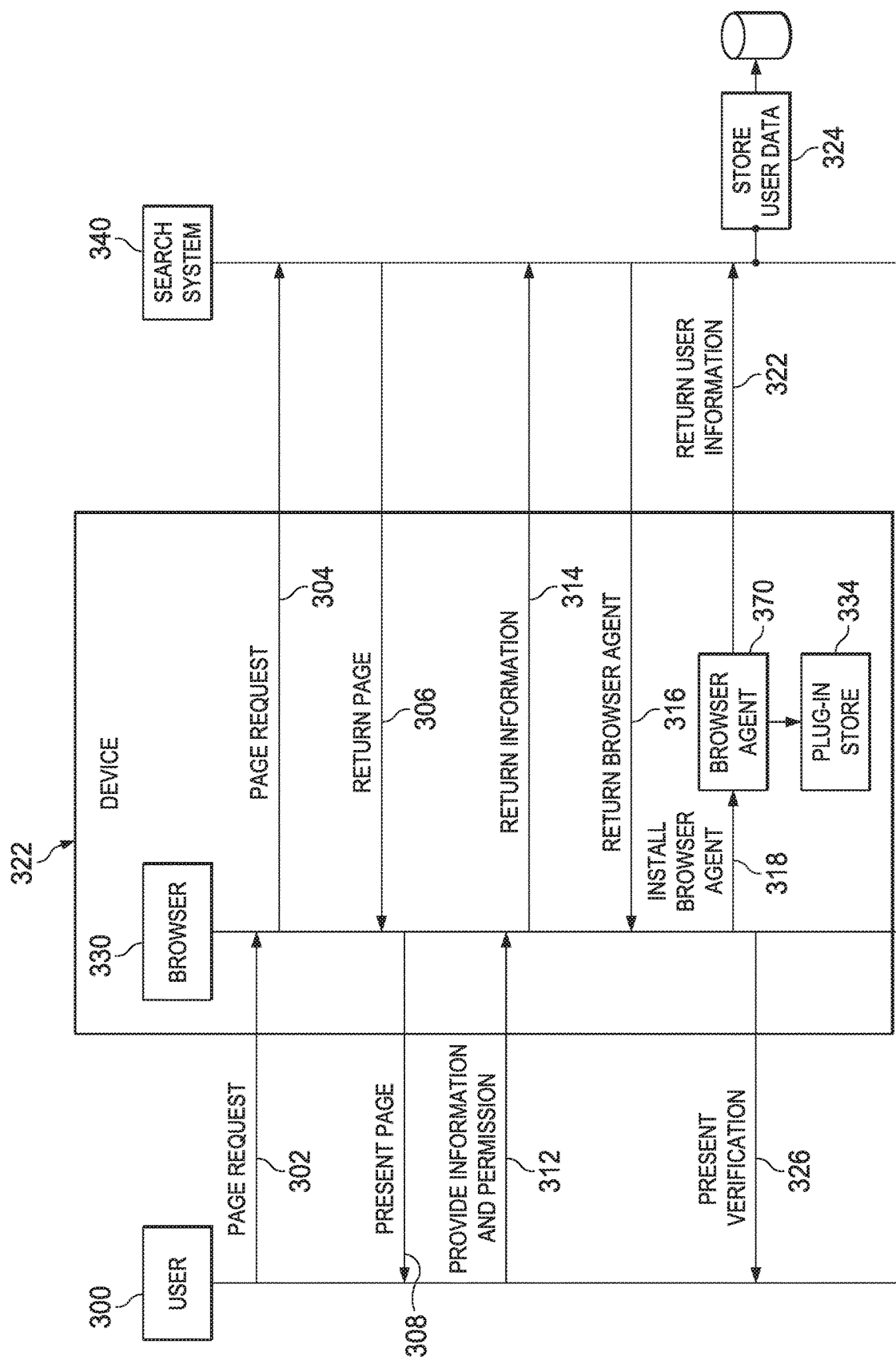
FIG. 3 depicts a flow diagram of one embodiment of the installation of an agent on a user device.

FIGS. 3 and 4 depict, respectively, flow diagrams for embodiments of the installation of a browser based agent and an operating system agent. It will be noted that while embodiments have been depicted as including both types of agents on a user's computer device, certain users' devices may have one only one type of agent installed (e.g., either an operating system agent or a browser agent, but not both), while other users' devices may have a both a browser agent and an operating system agent installed.

Referring first to FIG. 3, a user 300 at a device 322 may request an interface (e.g., a web page) from the user interface of the search system 340 (STEP 302). This page load request may have been initiated from clicking on a link in an email sent by an administrator of the team to which the user belongs or a link on a team web site, or the like.

This page request is sent from the browser 330 to the search system 340 (STEP 304), where the user interface at the search system 340 returns the appropriate page to the browser (STEP 306). The requested page is then presented to the user through the browser 330 (STEP 308). The user may provide any requested or desired information through the presented web page (STEP 312) which is then returned to the search system 340 (STEP 314).

The search system 340 can then determine what type of browser 330 the user is utilizing on the device 322 (e.g., either from the request/response received from the browser 330 or from the information provided by the user); access the system data store to retrieve the appropriate browser agent 370; and return the appropriate browser agent 370 to the user (STEP 316).

The browser agent 370 can then be installed as a plug-in to the browser 330 (e.g., in the plug-in store 334 of the browser 330) (STEP 318). During installation, the browser agent 370 may register with the browser 330 to be activated when a context of the browser is "true". This context can be, for example, "all URLs" such that every time a URL is accessed by the web browser 330, the browser agent 370 will receive a browser event from the web browser with the accessed URL. During installation the user may provide any required permissions for the installation of the browser agent 370 requested by the browser 330 on the device 332.

When the browser agent 370 is installed, it may generate or obtain a unique identifier for the user 300. This unique identifier can be reported back to the search system 340 (STEP 322) and stored in association with the team object for the team to which the user belongs (STEP 324). This identifier may be, for example, a numerical identifier, or may include an identifier for a user that is utilized by the user within the team but may be unique to the user such as the user's email address, or may be some combination of identifiers. Accordingly, the team object for the team can be associated with the unique identifier for user 300. Moreover, the browser agent 470 may be configured with the identifier for the team 220 and the user identifier such that communications from the browser agent 470 to the search system 340 may include one or more of these identifiers.

Moving now to FIG. 4, a user 400 at a device 422 may request an interface (e.g., a web page) from the user interface of the search system 440 (STEP 402). This page load request may have been initiated from clicking on a link in an email sent by an administrator of the team to which the user belongs or a link on a team web site, or the like.

This page request is sent from the browser 430 to the search system 440 (STEP 404), where the user interface at the search system 440 returns the appropriate page to the browser (STEP 406). The requested page is then presented to the user through the browser 430 (STEP 408). The user may provide any requested or desired information through the presented web page (STEP 412) which is then returned to the search system 340 (STEP 414).

The search system 440 can then determine what type of operating system 424 the user is utilizing on the device 422 (e.g., either from the request/response received from the browser 430 or from the information provided by the user); access the system data store to retrieve the appropriate operating system agent 472; and return the appropriate operating system agent 472 to the user (STEP 416). The operating system agent 472 may, for example, be a .exe file for user in cases where operating system 424 is a Windows based operating system or a .dmg file when operating system 424 is an Apple operating system such as OSX. Other types of operating system agents 472 configured for use with different operating systems 424 are possible and are contemplated herein.

The returned operating system agent 472 can then be saved down to the computing device 422 (STEP 418). It will be noted that the appropriate operating system agent 472 for the operating system 424 may be provided to the user 400 at the user device 422 in a wide variety of other manners, including, directly through a link, through an attachment to an email, through memory device such as a portable flash memory or in another manner.

The operating system agent 472 can then be installed on operating system 424 (STEP 436). The user may give any permissions requested by the operating system 424 for installation of the operating system agent 472 (e.g., such as when installing an .exe on Windows based operating system or .dmg in an OSX environment) (STEPS 432, 434). The operating system agent 472 can register (STEP 438) with the operating system 424 to receive operating system events associated with a URL or portion thereof, including particular paths or folders, or types of files. An example of the configuration of an operating system agent 472 is given in Appendix A. Thus, when operating system events (e.g., file system events) occur with respect to these URLs (e.g., paths or folders) or types of files these operating system events may be received by the operating system agent 472 installed on the operating system 424 of the device 422.

Additionally, when the operating system agent 472 is installed, it may also generate or obtain a unique identifier for the user 400. This unique identifier can be reported back to the search system 440 (STEP 442) and stored in association with the team object for the team to which the user belongs (STEP 444). This identifier may be, for example, a numerical identifier, or may include an identifier for a user that is utilized by the user within the team but may be unique to the user (such as the user's email address), or may be some combination of identifiers. Accordingly, the team object for the team can be associated with the unique identifier for user 400. Additionally, the operating system agent 472 may be configured with the identifier for the team 220 and the user identifier such that communications from the operating system agent 472 to the search system 440 may include one or more of these identifiers.

Returning to FIG. 2, a user associated with the team 220 may define apps or policies which the administrator of team 220 desires to collect events. These apps and polices will define the types or locations of content items or user interactions on which events will be collected, and for those events what data will be obtained and stored. In particular, a user (e.g., an administrator) associated with the team 220 may access the administrator interface 244 to define one or more apps and one or more policies associated with an app. An app object 274 and one or more associated policy objects 268 may be created by the driver engine 242 in the system data store 260 based on the user's definition of these apps or policies. An example definition of a policy based on content view events is presented in Appendix B.

An app corresponds to a resource through which content may be accessed by users or that is a repository of content. In one embodiment, a user may interact with the administrator interface 244 to define an app by providing a rootDomain for the app. The rootDomain is a definition of a location at which content may be accessed for that resource. An app objects 274 may be created by the driver engine 242 based on the definition of the app by the user associated with a team 220 interacting with the administrator interface 244, where the app object 274 is defined by its rootDomain. The app object 274 may be associated with the corresponding team object 262 representing the team 220 whose users access content through the resource represented by the app object 274.

Figure 10:
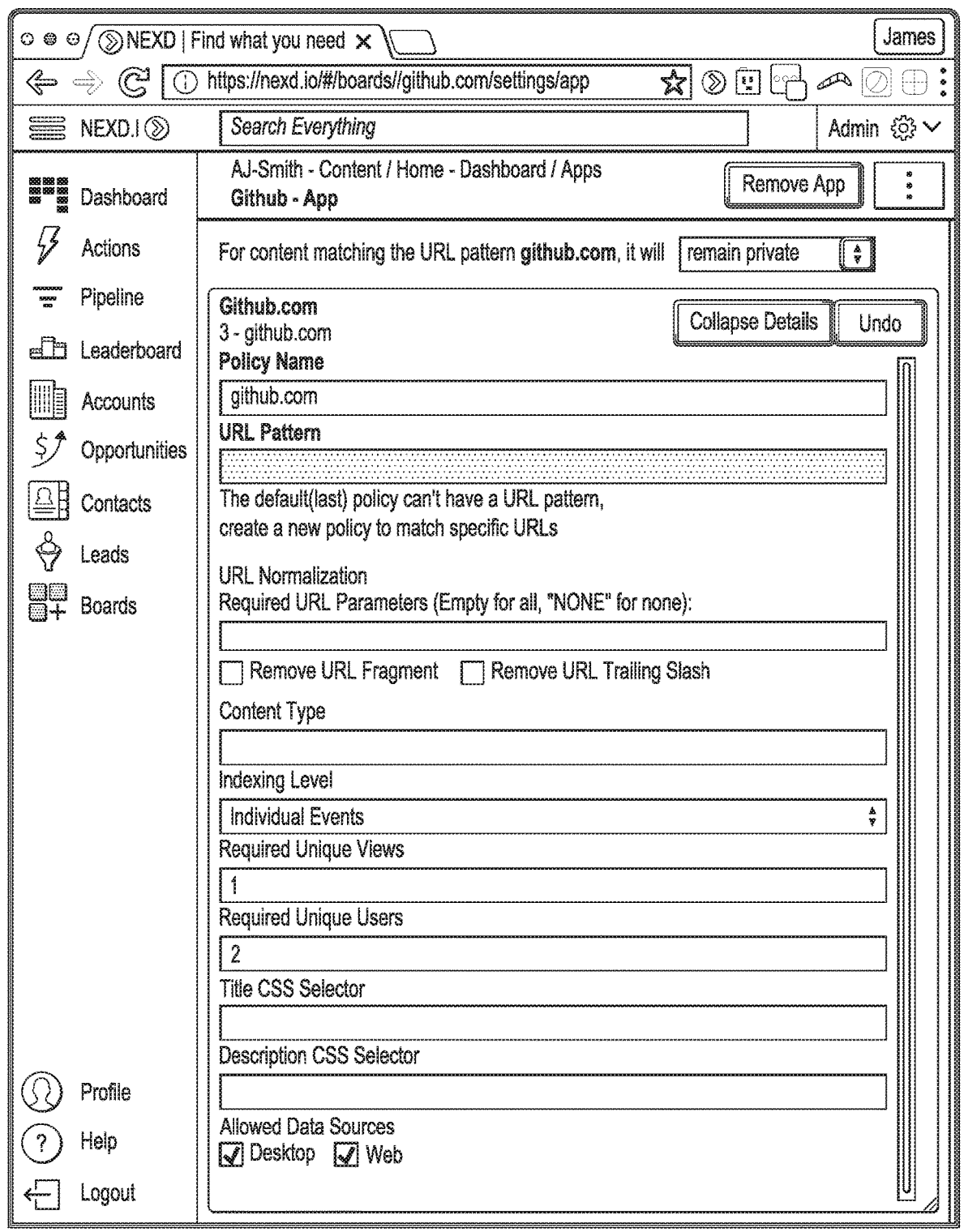
FIG. 10 depicts one embodiment of an interface by which a user may configure a policy.
Figure 11:
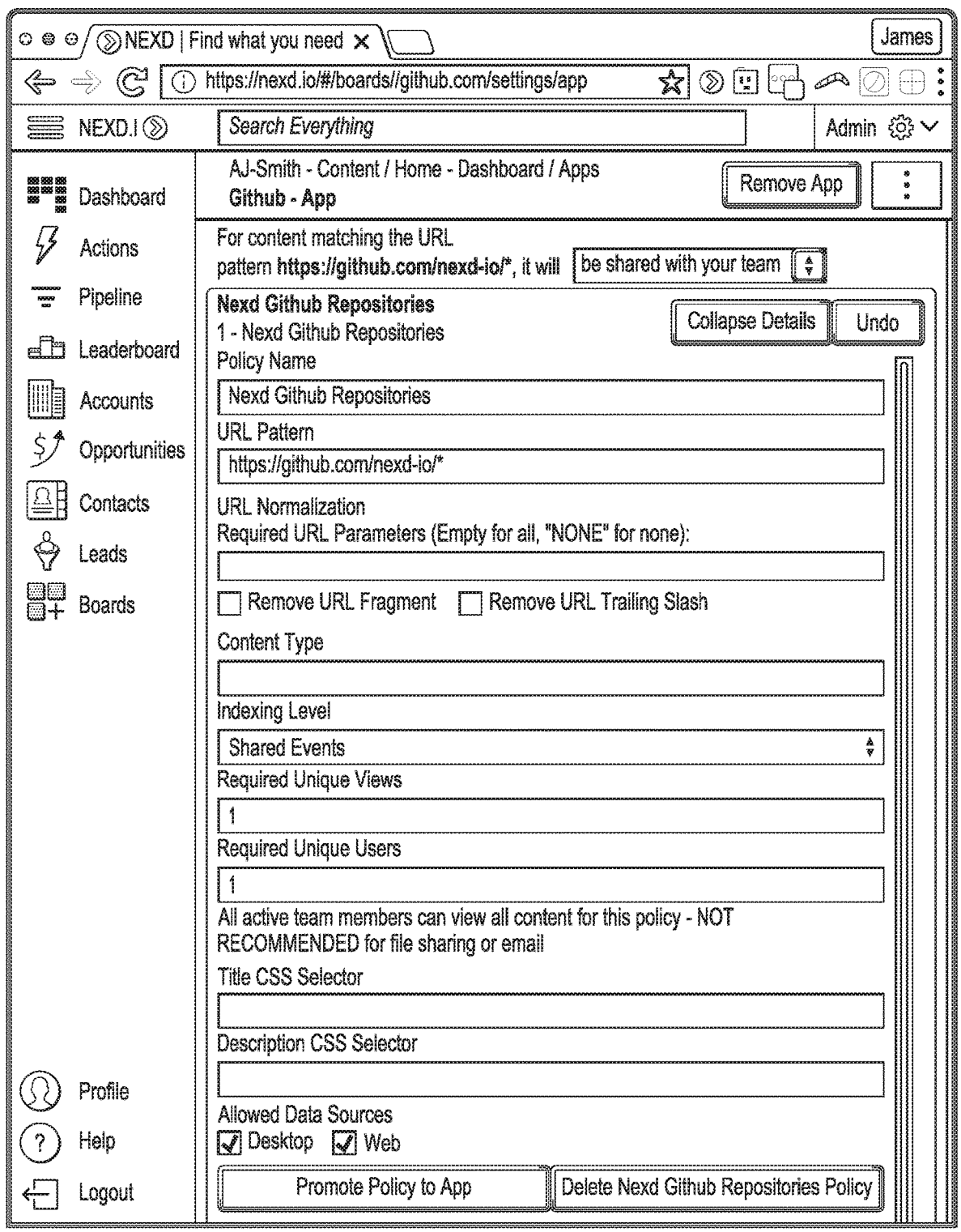
FIG. 11 depicts one embodiment of an interface by which a user may configure a policy.

A user may also interact with the administrator interface 244 to define one or more policies associated with each app. The user may provide a URL pattern that includes the rootDomain of the app with which it is associated. The user may also provide an indication as to whether events associated with the policy being defined should be shared amongst all users of the team 220 or should be private to the user whose interaction resulted in the event. The user may also define a global policy that defines default behavior for the rootDomain if no other policy applies to a URL that includes the rootDomain. For example, FIG. 10 depicts one embodiment of an interface where a user is defining a global policy for an app with the rootDomain "github.com"; while FIG. 11 depicts one embodiment of an interface where a user is defining a policy that will be associated with an app having "github.com" as a rootDomain where the URL Pattern for the policy is "https://github.com/nexd-io/*".

The driver engine 242 can thus create one or more policy objects 268 that are nested objects on an app object 174 associated with a team object 262. Each policy object 268 represents a policy defining whether and how to create events for content items where the URL matches a given URL pattern. A policy object 268 may thus include a URL Pattern to be evaluated against a URL of a content item. If the evaluation of the URL Pattern against the URL of a content item is true (e.g., the URL contains the URL pattern) the policy represented by that policy object 268 is considered to apply to that content item. A null URL pattern may indicate that the represented policy applies to all URLs having the rootDomain of the associated app object 274 (e.g., is a global policy).

A policy object 268 may also include a set of rules for defining how an event is to be created if the policy represented by the policy object 268 applies. In particular, these rules may indicate how a type of an event is to be determined, or what data is to be obtained about, or from, the content item or the user interaction in order to generate an event according to that policy. These rules may include such rules as a title selector for selecting a title for the content item, a description selector for selecting a description of the event, a name selector, rules governing how to determine what a type of event has occurred and to obtain data based on the event type. These rules may be specified by the user defining a policy or may be defined as part of a template or parent object on which the policy object is based, such that each policy object 268 may have a similar set of associated rules.

The agents 272, 270 installed at the user devices 222 of the team 220 may utilize the policies defined by these policy objects 268 in the collection of events at the user devices 222. These events may be returned to the search system 240 and stored as event objects 264 of a search index. Specifically, in one embodiment, when an agent 270, 272 receives a notification that a browser or operating system event has occurred with respect to a content item (e.g., as represented by a URL), the agent 270, 272 may send a policy request to the search system 240 through the agent interface 252. This agent interface may be a web based application programming interface (API), such as a Simple Object Access Protocol (SOAP) interface or a Representational State Transfer (REST) API. Other types of interfaces are possible and are fully contemplated herein.

The policy request sent by the agent 270, 272 on the device may include a domain portion of the URL included in the browser event or operating system event received by the agent 270, 272 along with the team identifier for the team 220 and a user identifier for the user of user device 222. Based on the policy request received through the agent interface 252, the driver engine 242 may access the system data store 260 to determine the app object 274 associated with the received domain portion included in the request. This determination may be made by accessing the team object 262 associated with the team identifier of the request and comparing the domain portion to the rootDomain of the app objects 274 associated with the team object 262 to determine if any app objects 274 have a rootDomain that includes the domain portion received in the request.

If an app object 274 having a rootDomain including the domain portion is found the policy objects 268 associated with that app object 274 may be obtained and returned to the agent 270, 272 through the agent interface 252. In particular, in certain embodiments, the system data store 260 may be a NoSQL data store such as that provided by Lucene or Elasticsearch. To return the policy objects 268 to the requesting agent 270, 272 they may be serialized into JavaScript Object Notation (JSON). The policy objects 268 may thus be returned as one or more JSON objects (sometimes referred to as JSON documents).

When the agent 270, 272 receives the response to the policy request including the policies, the agent 270, 272 can evaluate each policy against the URL of the initially received operating system or browser event to determine which, if any, policy applies. In particular, the URL pattern of a policy may be compared to the URL of initial event to determine if the URL matches the pattern of the policy. If no policy applies (e.g., there is no URL pattern that the URL matches) no more actions may be taken by the agent 270, 272. However, if a policy applies, an event may be created based upon the applicable policy.

To create an event, the rules of the applicable policy are applied by the agent 270, 272 to determine the data associated with that event. The event may include, for example, the URL of the event (e.g., the full URL as received in the browser event or operating system event), whether the event is shared or private, an identifier for the team 220, an identifier for the user, an identifier of the app with which the event is associated, an identifier or name of the policy, an action associated with the event, etc. The event can then be returned to the search system 240 through the agent interface 252. In one embodiment, the applicable policy may serve as a template that is populated by the agent 270, 272 based on evaluation of the rules of the policy. The event is thus an object (e.g., a JSON object) that may be returned by the agent 270, 272.

When the event is received, the driver engine 242 can assign a time to the event (e.g., store a timestamp in the event) and determine if there is a content object 266 in data store 260 representing the content item associated with the event. This determination can be made be searching the content objects 266 associated with the team identifier for the team 220 to determine if any of the associated content objects 266 include the URL of the event. If there is no content object 266 for the team 220 associated with the URL of the event, the driver engine 242 may create a content object 266 representing that content item, where the content object 266 includes the URL for the event.

The event received from the agent 270, 272 at the agent interface 252 may then be stored as an event object 264 in association with the content object 266 representing the content item associated with the event. Again, in certain embodiments, the system data store 260 may be a NoSQL data store where the event object returned by the agent 270, 272 may be stored substantially directly by the system data store 260 by deserializing the returned event, which is itself an object (e.g., the JSON object). A definition for content and event objects for such a data store is presented in Appendix C.

In this manner, only content objects 266 representing content items on which events have occurred are stored in the system data store 260 and these content objects 266 representing these items and the event objects 264 representing events associated with those content objects 266 may form an event based search index for the search system 240.

A discussed, users of team 220 may access content through other resources using an interface or architecture that does not provide simple visibility into user interactions or otherwise does not allow these user interactions to be easily monitored. In such cases, user interaction events may often be obtained directly from a web application 210 or hosted application 212 using an interface (e.g., an API) offered by the web application 210 or hosted application 212. To obtain and process events from these types of resources the search system 240 may include a remote agent engine 250 executing a remote agent 254 at some time interval. The remote agent 254 may be configured to work similarly to the browser agent 270 and operating system agent 272 in that it uses the policy objects 268 defined for the app associated with the web application of hosted application to determine if events should be created and stored.

In one embodiment, the remote agent engine 250 may be configured to access the web application 210 or hosted application using an offered API and obtain an event log for a user or a team 220. The remote agent 254 can then process the individual log events in the event log to determine if an event should be stored at the search system 240 based on events in the obtained event log.

Specifically, for each log event in the event log, the remote agent may access the system data store 260 to determine the app object 274 associated with the log event based on a URL included in the log event. If an app object 274 is found the policy objects 268 associated with that app object 274 may be obtained and evaluated against the URL of the log event to determine if any policy applies. If no policy applies (e.g., there is no URL pattern that the URL matches) no more actions may be taken by the remote agent 254 for the log event and the next log event (if any) may be evaluated. However, if a policy applies, an event may be created based upon the applicable policy.

To create an event, the rules of the applicable policy are applied by the remote agent 254 to determine the data associated with that event. The remote agent 254 can then determine if there is a content object 266 in data store 260 representing the content item associated with the event. If there is no content object 266 associated with the URL for the team 220, the remote agent 254 may create a content object 266 representing that content item, where the content object 266 includes the URL for the event. An event object 264 may then be stored in association with the content object 266 representing the content item associated with the event. Accordingly, content objects 266 representing content items accessible through a hosted application 212 or web application 210 and the event objects 264 representing events associated with those content items may be added to the event based search index for the search system 240.

Figure 5A:
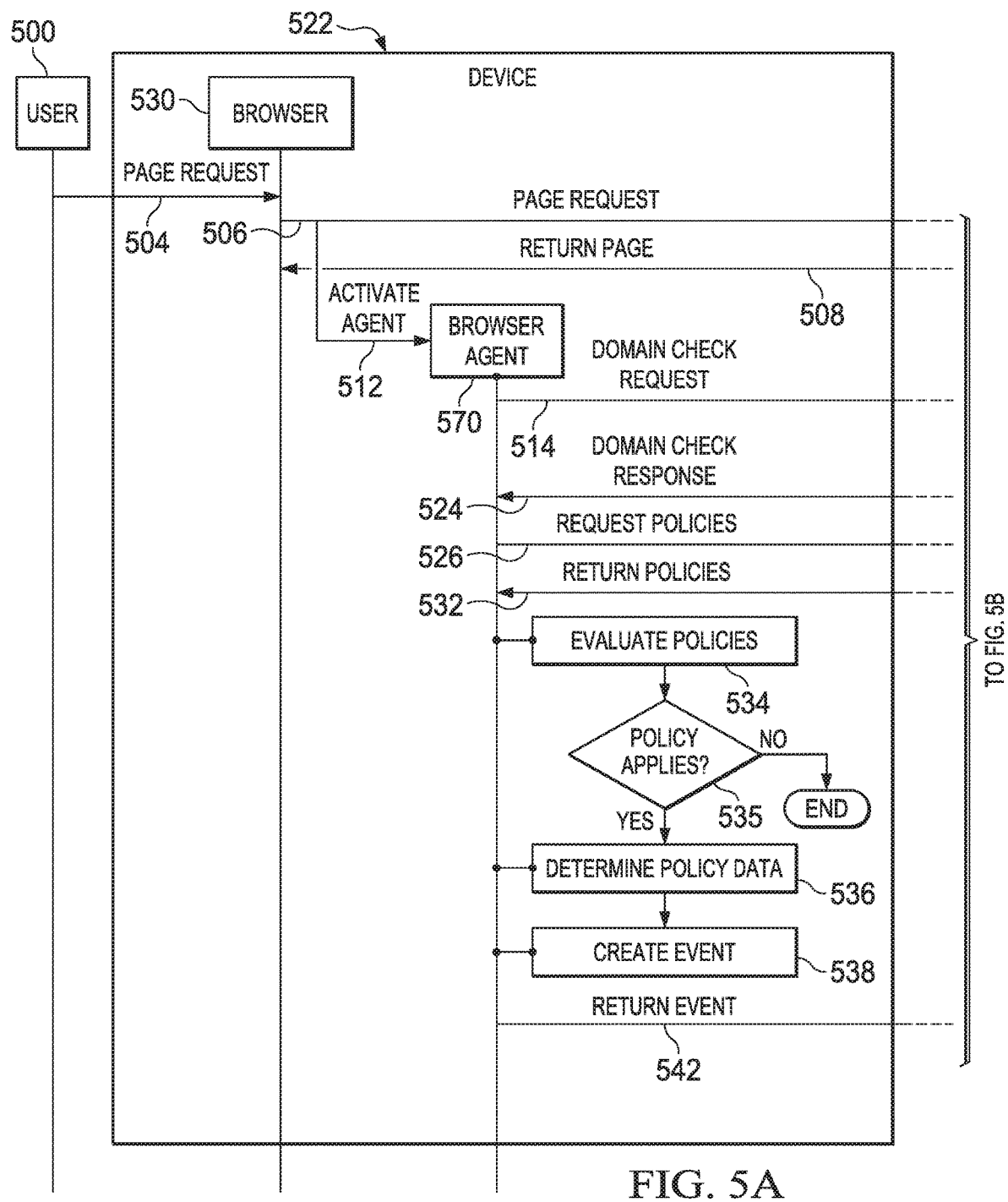
FIGS. 5A and 5B depict a flow diagram of one embodiment of the updating of an event based search index using an agent on a user device.
Figure 5B:
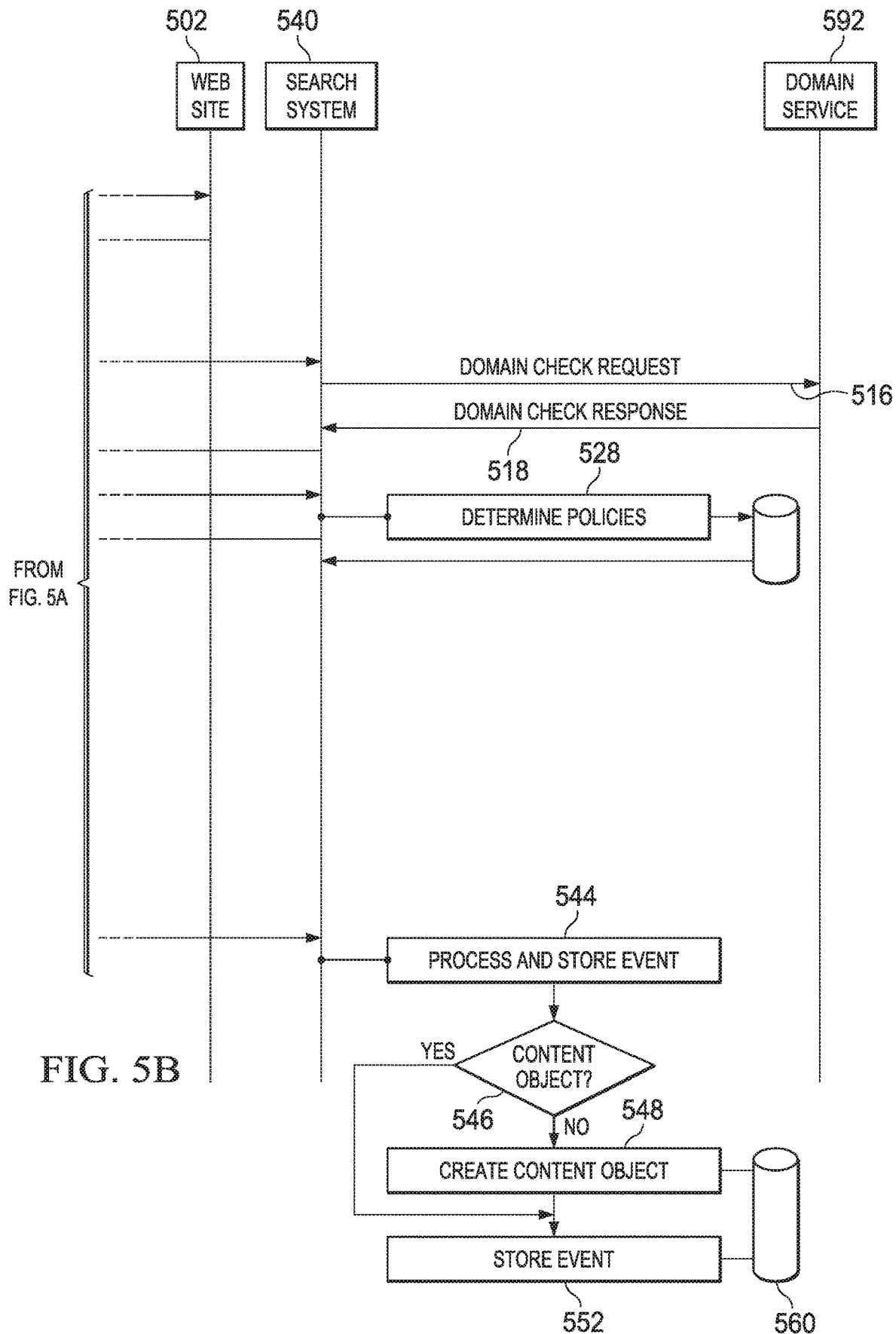

FIGS. 5A, 5B, 6A, 6B and 7 depict, respectively, flow diagrams for embodiments of the collection of events using respectively, a browser agent, an operating system based agent and a remote agent. Referring first to FIGS. 5A and 5B, a user 500 at a device 522 may request a URL from a web site associated with the domain of the URL (STEP 504). This page request is sent from the browser 530 at the user device 522 to the web site (STEP 506), which returns the requested web page to the browser 530 (STEP 508). The browser can render the web page and present it to the user. Based on the context associated with the browser agent 570, the browser 530 may activate the browser agent 570 and send a browser event to the browser agent 570 indicating the user 500 has accessed the URL (STEP 512).

In one embodiment, based on the received browser event, the browser agent 570 may determine a domain associated with the received URL of the browser event and make a domain check request to the search system 540 with that domain (STEP 514). The purpose of such a domain check request may be to ensure that the domain is not associated with blocked, inappropriate or undesirable content or malware, as administrators or operators of team 220 or search system 540 may not be interested or may not desire to collect events regarding such content. In particular, operators of search system 540 may not desire that such content be accessible through their system (e.g., when search results containing a URL are returned) or to collect data on users who access such content.

The search system 540 may thus receive such a domain check request from the browser agent 570 and use a domain check service 592 to determine if the domain is associated with undesirable content or malware. Domain check service 592 may be a blacklist engine or online reputation tool such as the Google Malware Tool, SUCURI, VirusTotal, ScanURL, etc. Search system 540 sends a domain check request (STEP 516) to the domain service 592 with the domain received from the browser agent 570 and receives a response from the domain check service 592 indicating the status of the domain (STEP 518).

Based on the status of the domain check response from the domain service 592, the search system 540 sends a corresponding domain check response (STEP 524) to the browser agent 570 indicating whether the browser agent 570 should proceed any further in processing the browser event. If the domain check response received at the browser agent 570 indicates the browser agent 570 should stop (e.g., the domain is associated with undesirable data or malware) the processing of the browser event by the browser agent 570 may stop.

If however, the domain check response indicates that the browser agent 570 should proceed, the browser agent 570 may send a policy request to the search system 540 (STEP 526). The policy request sent by the browser agent 570 on the device 522 may include the domain portion of the URL included in the browser event received by the browser agent 570 along with the team identifier for the team and a user identifier for the user of user device 522. Based on this policy request the search system 540 may access the system data store to determine the policies associated with the received domain portion included in the request (STEP 528).

This determination may be made by accessing the team object associated with the team identifier of the request and comparing the domain portion to the rootDomain of the app objects associated with the team object in the data store to determine if any app objects have a rootDomain that includes the domain portion received in the request. If an app object having a rootDomain including the domain portion is found the policy objects associated with that app object may be obtained and returned to the browser agent 570 (STEP 532).

When the browser agent 570 receives the response to the policy request including the policies, the browser agent 570 can evaluate each policy against the URL of the initially received browser event to determine which, if any, policy applies (STEP 534). In particular, the URL pattern of a policy may be compared to the URL of the initial event to determine if the URL matches the pattern of the policy. If no policy applies (e.g., there is no URL pattern that the URL matches) no more actions may be taken by the browser agent 570. However, if a policy applies, an event may be created based upon the applicable policy (STEP 535).

To create an event, the rules of the applicable policy are applied by the browser agent 570 to determine the data associated with that event (STEP 536) and the event created with that data (STEP 538). The event may include, for example, the URL of the event (e.g., the full URL as received in the browser event), whether the event is shared or private, an identifier for the team, an identifier for the user, an identifier of the app with which the event is associated, an identifier or name of the policy, an action associated with the event, etc. The event can then be returned to the search system 540 (STEP 542).

When the event is received, the search system 540 can process and store the event (STEP 544). For example, in one embodiment the search system 540 can assign a time to the event and determine if there is a content object in data store 560 representing the content item associated with the event (STEP 546). This determination can be made be searching the content objects associated with the team identifier for the team to determine if any of the associated content objects include the URL of the event. If there is no content object associated with the URL for the team, the search system 540 may create a content object representing that content item, where the content object includes the URL for the event (STEP 548).

The event received from the browser agent 570 may then be stored as an event object in association with that content object representing the content item associated with the event (STEP 552).

Figure 6A:
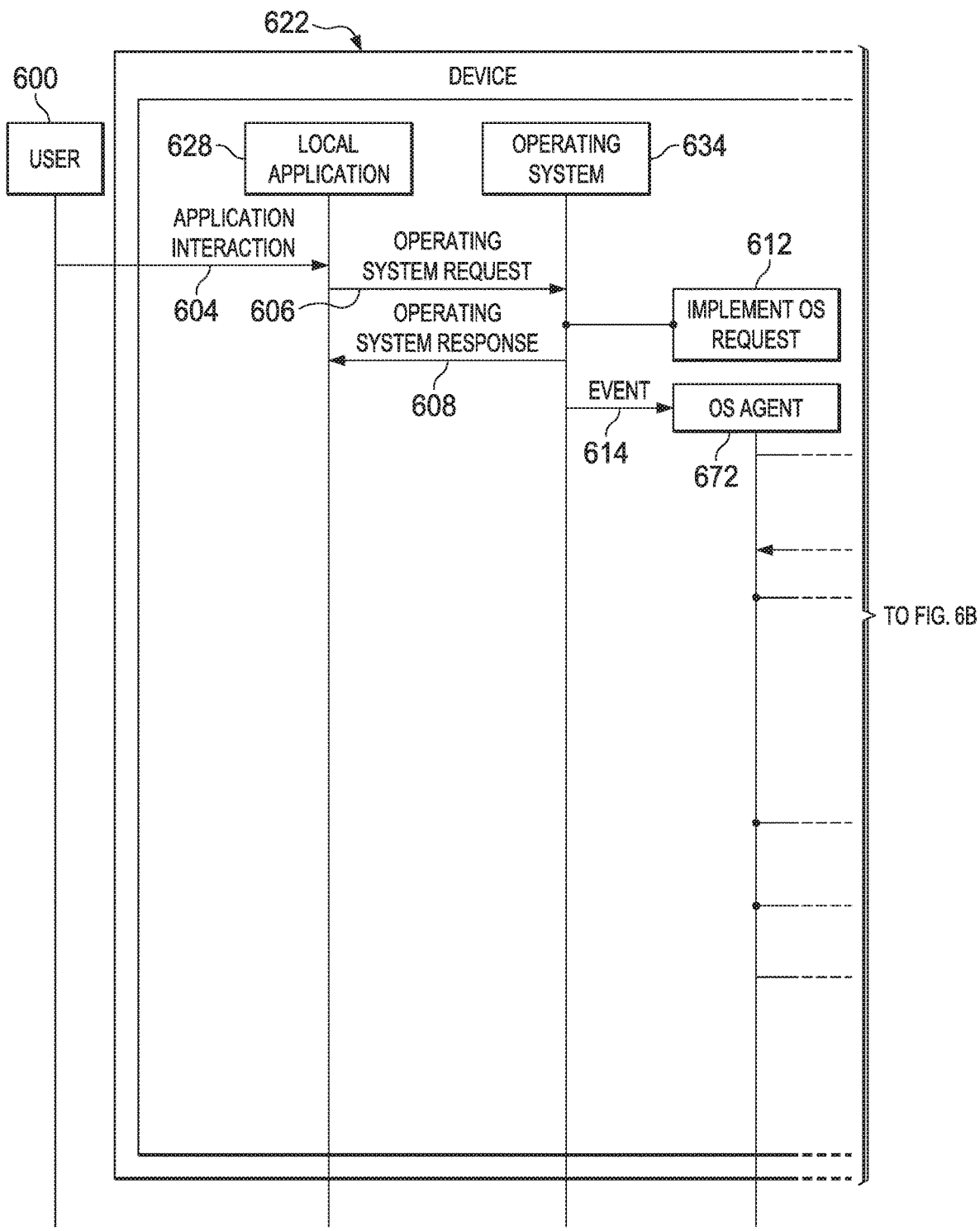
FIGS. 6A and 6B depicts a flow diagram of one embodiment of the updating of an event based search index using an agent on a user device.
Figure 6B:
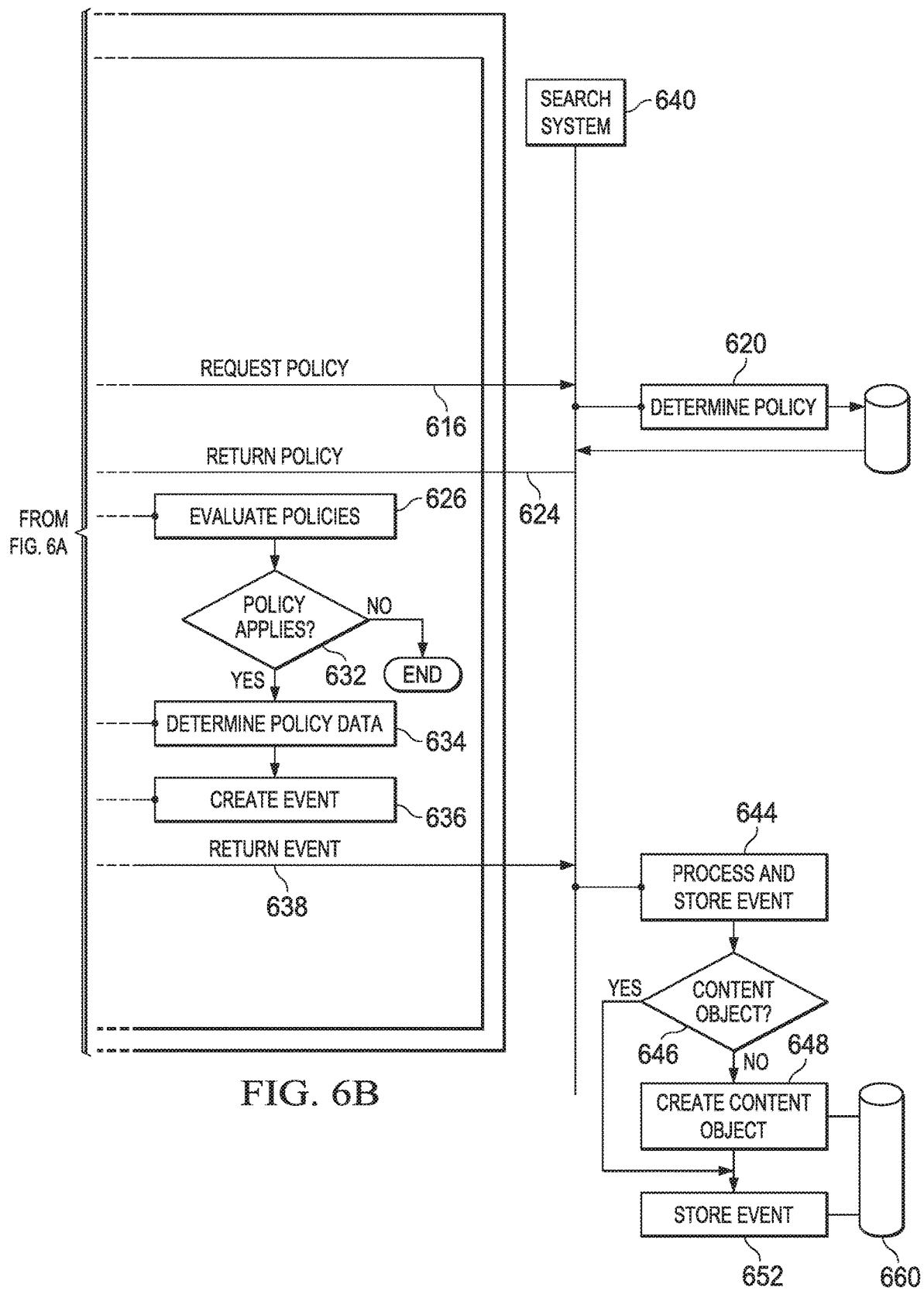

Looking now at FIGS. 6A and 6B, a flow diagram for event collection using an operating system agent is depicted. A user 600 at a device 622 may interact with a local application 628 executing on the user device 622 to access or otherwise interact with a content item. This interaction with the content item may cause the local application 628 to generate one or more operating system requests to the operating system 634 by the local application 628. The operating system 634 may implement those requests (STEP 612) and return any responses to the local application 628 (STEP 608).

Additionally, if the operating system request is associated with a URL or portion thereof (e.g. folder or path) and a type of file that the operating system agent 672 has register with the operating system 634, an operating system event may be sent to the operating system agent 672 (STEP 614). Upon receiving the operating system event, the operating system agent 672 may send a policy request to the search system 640 (STEP 616). The policy request sent by the operating system agent 672 on the device 622 may include the domain portion of the URL included in the operating system event received by the browser agent 570 along with the team identifier for the team and a user identifier for the user of user device 522. In this case, as the URL may not include a typical web based domain name (e.g., "www.google.com") the domain portion may include a portion (including the entire portion) of the path or folder comprising the URL. Alternatively, the operating system agent 572 may create a domain name based on the identifier for the user 600, the user's device 622 or the team identifier (e.g., domain identifier created uniquely for that user's device that may include an identifier for the user or the user's device (e.g., userX-guid.laptop-client.guid) and include this domain in the policy request.

Based on this policy request the search system 640 may access the system data store to determine the policies associated with the received domain portion included in the request (STEP 620). This determination may be made by accessing the team object associated with the team identifier of the request and comparing the domain to the rootDomain of the app objects associated with the team object in the data store to determine if any app objects have a rootDomain that includes the domain received in the policy request. If an app object having a rootDomain including the domain is found, the policy objects associated with that app object may be obtained and returned to the operating system agent 672 (STEP 624).

When the operating system agent 672 receives the response to the policy request including the policies, the operating system agent 672 can evaluate each policy against the URL of the initially received operating system event to determine which, if any, policy applies (STEP 626). In particular, the URL pattern of a policy may be compared to the URL of the initial event to determine if the URL matches the pattern of the policy. If no policy applies (e.g., there is no URL pattern that the URL matches) no more actions may be taken by the operating system agent 672. However, if a policy applies, an event may be created based upon the applicable policy (STEP 632).

To create an event, the rules of the applicable policy are applied by the operating system agent 672 to determine the data associated with that event (STEP 634) and the event created with that data (STEP 636). The event may include, for example, the URL of the event (e.g., the full URL as received in the operating system event), whether the event is shared or private, an identifier for the team, an identifier for the user, an identifier of the app with which the event is associated, an identifier or name of the policy, an action associated with the event, etc. The event can then be returned to the search system 640 (STEP 638).

When the event is received, the search system 640 can process and store the event (STEP 644). For example, in one embodiment the search system 640 can assign a time to the event and determine if there is a content object in data store 660 representing the content item associated with the event (STEP 646). This determination can be made be searching the content objects associated with the team identifier for the team to determine if any of the associated content objects include the URL of the event. If there is no content object associated with the URL for the team, the search system 640 may create a content object representing that content item, where the content object includes the URL for the event (STEP 648).

The event received from the operating system agent 672 may then be stored as an event object in association with that content object representing the content item associated with the event (STEP 652).

It should be noted here that, in one embodiment, events that have already occurred on a user's device may be utilized to populate the system data store of a search system with events when a browser agent or operating system agent is initially installed on the user's device. Specifically, a user's browser history may be indicative of user interaction events with the content items resident at the URL's contained in the browser history. Accordingly, in one embodiment the user's browser history may be processed to extract and create events. For example, when a browser based agent is installed on a user's device, the browser agent may access the browser history of the browser on which it is installed. Each URL within the browser history may be processed substantially as detailed above with respect to a browser event to determine if an event should be generated by the browser agent based on the URL (or other associated information in the browser history). For any browser events in the browser history that meet a policy an event may be created and a corresponding event object stored at the search system.

Similarly, a user's file accesses may be indicative of user interaction events with those content items. Therefore, in one embodiment the file access history may be processed to extract and create events. For example, when an operating system agent is installed on a user's device, the operating system agent may access the file access history of the file system of the device. Each URL within the file access history may be processed substantially as detailed above with respect to operating system events to determine if an event should be generated based on the URL (or other associated information in the file history). For any of the operating system events (e.g., the file accesses in the file access history) that meet a policy, the operating system agent may create an event such that a corresponding event object is stored at the search system.

Moving on to FIG. 7, a flow diagram for one embodiment of event collection using a remote agent is depicted. Initially, a user 700 at the team may configure the search system 740 to collect events from a hosted application 732 (or web application, etc.) such that the remote agent can access the hosted application 732 using the credential for the team or a user of the team.

In order to perform this configuration the user may request a configuration interface provided by the search system using a browser 730 on his device (STEP 702). This page request may be sent form the browser 730 to the search system 740, which returns the requested configuration page to the browser where it is presented to the user (STEPS 704, 706). The user can then provide configuration information for the hosted application 732 through the web page such that is returned to the search system 740 (STEPS 708, 710). This configuration data for the hosted application may include, for example, an identification of the hosted application, a URL of the hosted application 732, a username or password for the team or individual users, etc. The user may also define one or more policies in association with the hosted application 732.

Figure 12:
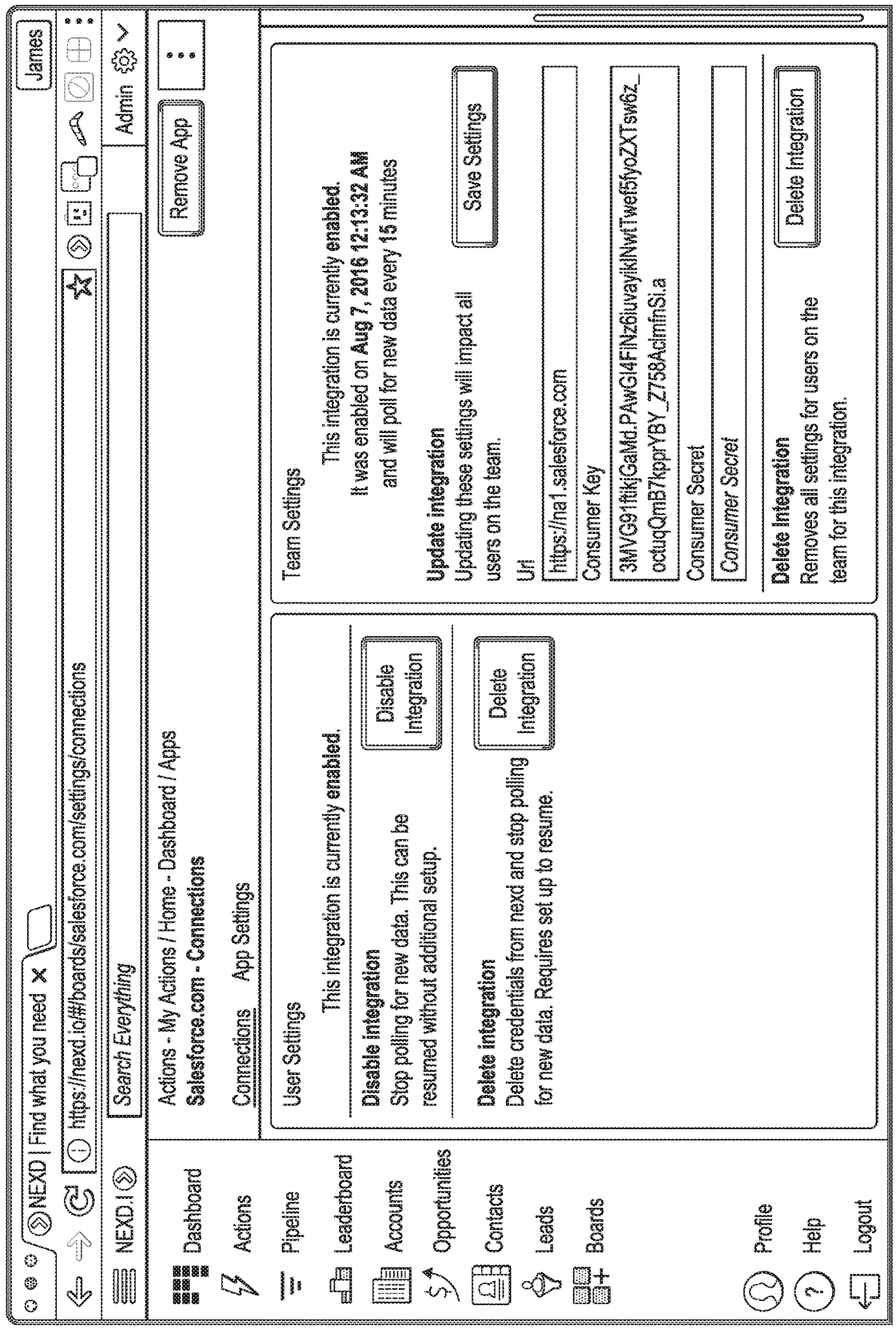
FIG. 12 depicts one embodiment of an interface by which a user may provide configuration information for an agent.

One embodiment of an interface for configuring the search system 740 to for a hosted application 732 is depicted in FIG. 12. Here, the user is providing a URL and associated key for the Salesforce hosted application. Using this URL and associated key the search system may be used to access the events associated with that team directly from the provided URL.

Referring to FIG. 7 again, this configuration information may be stored in system data store 760 in association with the team object for the team such that it can be determined from the team object that the user has configured the search system 740 to access events from the identified hosted application 732 and the configuration information that allows access to the hosted application 732 on behalf of the team (STEP 720). Specifically, an app object and one or more policy objects may be created for the hosted application 732 in the system data store 760 and associated with the team object for the user's team.

Search system 740 includes a remote agent engine 754 that is executed at some time interval. The remote agent engine 754 may access the team object and associated app object to determine that events are to be collected from hosted application 732, a URL or other location where hosted application 732 is to be accessed, and the configuration data (e.g., authentication information) to use to access the hosted application (STEP 722).

Using this information the remote agent 754 may formulate a request for an event log for the team according to an API or other interface offered by the hosted application 732 (STEP 724). In response to the request, an event log 770 containing events associated with the team may be returned from the hosted application 732 to the remote agent 754 (STEP 726). The event log 770 may be a list or other enumeration of events that occurred with respect to users of the team on certain content items (identified by their URL in the event) along with other data of the event.

The remote agent 754 may process each individual event of the received event log to determine if an event object should be created and stored in the system data store 760. Specifically, for each log event in the event log 770, the remote agent may access the system data store 760 to determine the policy objects associated with the hosted application 732 to determine if any policy applies (STEP 774). If no policy applies (e.g., there is no URL pattern of a policy that the URL of the event matches) no more actions may be taken by the remote agent 754 for that log event and the next log event (if any) may be evaluated. However, if a policy applies, an event object and content object (if needed) for the event may be created and stored based upon the applicable policy (STEP 776).

To create an event, the rules of the applicable policy are applied by the remote agent 754 to determine the data associated with that event. The remote agent 754 can then determine if there is a content object in data store 760 representing the content item associated with the event. If there is no content object for that content item for the team associated with the URL of the event, the remote agent 754 may create a content object representing that content item, where the content object 266 includes the URL for the event. An event object may then be stored in association with the content object representing the content item (either previously existing or newly created) associated with the event. Accordingly, content objects representing content items accessible through a hosted application 732 and the event objects representing events associated with those content items may be added to the event based search index for the search system 740.

Now referring back to FIG. 2, as discussed throughout the event objects 264 in the system data store 260 form a search index that may be utilized by the search system 240 to search for content items (represented by content objects 266) that are responsive to a user's search. It should be noted here that, in one embodiment, the event objects 264 forming the event based search index, or the associated content objects 266, may change retroactively (e.g., after the event objects 264 or content objects 266 have been stored) based on a change (or elimination) of a policy. In this manner, not only may embodiments of such an event based search index be reflective of the events or content items accessed by a team 220, but the search index may also be reflective of the current policies of the team 220, even if those policies have changed subsequently to an event occurring.

Specifically, an administrator of the team 220 may access the search system 240 through the administrator interface 244 to change one or more existing policies (as represented by policy objects 268) associated with the team 220 (e.g., the team object 262 for that team 220). This alteration in policy may involve, for example, a change to the URL pattern of the policy or the set of rules that may be used to create an event based on the policy.

Based on the change in the policy, embodiments may use the identifier of the altered policy the driver engine 242 to access the event objects 264 associated with that policy object 268 for that altered policy (e.g., the events that were created based on that policy by an operating system agent 272, browser agent 270 or remote agent 254). The driver engine 242 can then evaluate the altered policy of the policy object 268 against each of these event objects 264, using, for example, the URL pattern and rules of the altered policy and the data contained in the event object 264 (e.g., the URL or other information of the event object 264).

If the event object 264 would not have been created under the altered policy of the policy object 268 (e.g., by an operating system agent 272, browser agent 270 or remote agent 254) the event object 264 may be removed from the system data store 260. Alternatively, if the event represented by the event object 264 would have different data based on the altered policy, the event object 264 may be altered in that manner. When each of the event objects 264 associated with the altered policy has been evaluated, the driver engine 242 may then determine any content objects 266 that no longer have any events objects 264 associated with them (e.g., because they were removed based on the altered policy) and remove these content objects 266 from the system data store 260.

Generally, then, content items (represented by content objects 266) responsive to a user's search may be effectively located using a search index formed from the event objects 264 in the system data store 260. By using the event objects 264 representing events occurring with respect to content items (e.g., user interaction events with the content items) the determination of the importance of content relative to a search may be based on information other than the contents of the document themselves. Using these events, the determination of importance for content may be based on, for example: frequency of interaction of the searching user or a group of users with content, the distribution of users' interactions, recency of the searching user's or a group of users interaction with content, type of interaction with content, etc. Moreover, these measures of importance can be determined relative to a searching user himself, or across groups of users within a team (including all monitored users of a team). The search results returned by embodiments of such search systems may thus be based on user interaction with content and be more relevant to users.

Specifically, search module interface 246 allows a user at a user device 222 in a team 220 to submit a search to the search system 240. The search interface 246 may establish a context for the search, including the identity of the user and any query the user submits. The identity of the user may be established, for example, by asking or requiring the user to authenticate or provide a user identifier (e.g., email address, username and password, etc.). This identifier may be the same as the team based unique identifier for the user or an identifier by which the team based unique identifier may be accessed or determined. The context of the query may include a date or date range or one or more search terms submitted by the user in the query. It is noted, however, that such context items (including search terms themselves) are not required to perform a search according to embodiments. For example, in one embodiment, a search with a context of only the user's identity may be performed substantially automatically by the search interface 246 when the user accesses the search interface 246.

In any event, the context for the search may be passed to the search module 280, which conducts the search utilizing the search index comprising the event objects 266 contained in the system data store 260 and returns the results to the search interface 246. Search interface 246 can then present the results of the search to the user. In particular, in one embodiment, the search results contain a ranked list or otherwise organize presentation of content items as represented by the URLS for those content items. The user who submitted the search can then directly access the relevant content items by interacting with the returned URL (e.g., clicking on a link) without further involvement of the search system 240.

Figure 8:
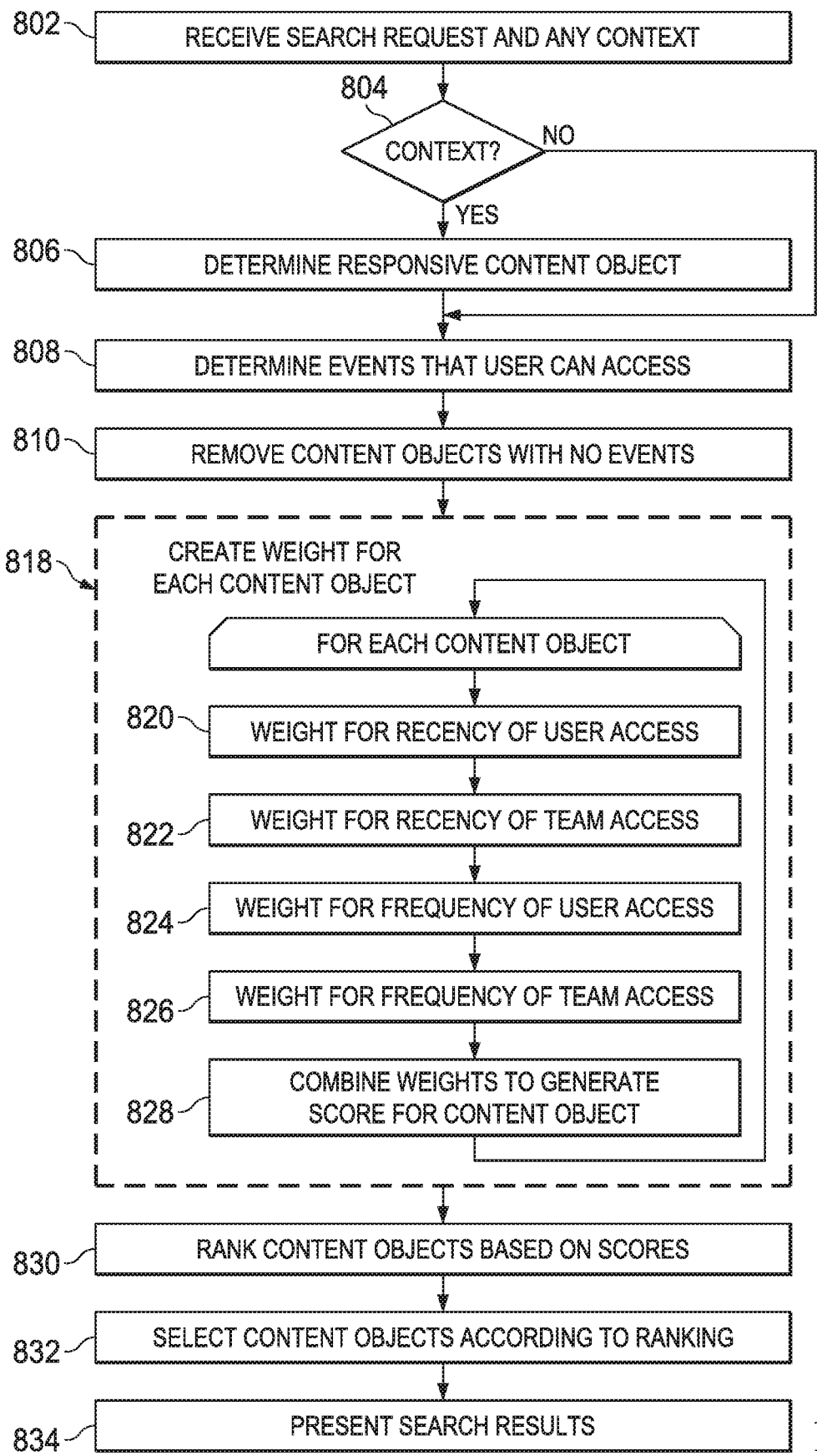
FIG. 8 depicts a flow diagram of one embodiment of a method of implementing a search using an event based search index.

FIG. 8 depicts a flow diagram of one embodiment of a method that may be utilized by a search module to implement a search using the event based search index. The search module may receive the search context, including the user identity, any search terms and any dates or date ranges submitted in the query (STEP 802). It can then be determined if there is any search context other than the user's identity such as any dates or search terms (STEP 804). If there is no context besides the user identity the search may proceed at (STEP 808). If, however, there are any search terms or data ranges in the context (or any other context besides the user identity), the search module accesses the system store of the search system to determine any content objects that are responsive to those search terms or dates (STEP 806). In particular, in one embodiment, a keyword search for the search terms may be performed on one or more fields of the content objects (e.g. the title, description, URL) associated with the team of the user to determine content objects responsive to the keyword search. Specifically, the team object associated with the user identifier may be determined and the team identifier associated with that team object used to determine the content objects associated with the user's team. The content objects of the team can then be searched using the search terms or dates to determine content objects in the search system data store that are both responsive to the search terms or date ranges and are associated with the user's team.

At this point, then, the universe of content objects for the search includes all content objects for the team of the user (in the case where there is no additional search context) or content object that both belong to the team and are responsive to the search context. The search module can then obtain all the event objects representing events on this universe of content objects and determine the events objects that the user can access (STEP 808). As described, each content object may have one or more event objects associated with it. The search module may obtain the event objects associated with each of the universe of content objects.

Moreover, in one embodiment, each event object may have a designation of whether the user can access the event object. This designation may include if the event object is associated with the user identifier of the search (e.g., the event object represents an event that occurred with respect to the user conducting the search or has a matching user identifier). Additionally, the designation may include an event that is designated as shared, even if the event object is associated with another user (e.g., user identifier). In one embodiment, the only event objects that the user may not access are event objects that are associated with another user and are designated as private. It will be noted that the above is one embodiment of designating event objects as accessible by users, other embodiments are possible. Additionally, it may be the case that event objects do not have such designations, and all event objects may be accessible by all users. Thus, in such instances this step may result in all the event objects associated with each of the universe of content objects.

At this point, the universe of event objects for the search includes all the event objects associated with all of the universe of content object that the searching user can access. An overall weight (or score) can then be created for each of the universe of content objects by the search module based on the event objects of the universe of event objects associated with that content object (STEP 818). Specifically, to generate the overall weight for a content object, a weight may be generated for recency of user access to the content object (STEP 820). The recency of user access can be determined by determining event objects associated with the content object that are also associated with the user identifier for the searching user. Each of these event objects may include an associated time. The recency of user access weight can be generated based on the time of a most recently occurring, or set of most recently occurring, of these event objects for the content object.

Similarly, a weight may be generated by the search module for recency of team access to the content object (STEP 822). The recency of team access can be determined by determining all event objects (of the universe of event objects) associated with the content object. Each of these event objects may include an associated time. The recency of team access weight can be generated based on the time of a most recently occurring, or set of most recently occurring, of these event objects for the content object.

A weight may also be generated for frequency of user access to the content object (STEP 824). The frequency of user access can be determined by determining event objects associated with the content object that are also associated with the user identifier for the searching user. The frequency of user access weight can be generated based on the number of these event objects (e.g., associated with the searching user) for the content object.

Another weight component may be generated by the search module for frequency of team access to the content object (STEP 826). The frequency of team access can be determined by determining all event objects (of the universe of event objects) associated with the content object. The frequency of team access weight can be generated based on the number of these event objects for the content object.

The various weight components may then be combined to generate a score for the content object (STEP 828). The weights given to each of the component weights to generate the final score may be equal or the weights associated with the user (e.g., frequency and recency of user access) may be weighted more heavily. Additionally, one or more of the component weights may or may not be utilized in the determination of the score for the content object. It will also be noted with respect to the component weights discussed that these component weights are exemplary only. More, fewer or different component weights may be utilized in the generation of an overall score for the content object. Other methods may also be utilized to generate the overall score for a content object based on the event objects associated with the content object, including those methods that do not utilize component weights, and such methods are fully contemplated herein. For example, one embodiment of a weighting and scoring method that includes boosting of content results based on views and updated events is presented in Appendix D.

Once an overall score has been generated for each content object of the universe of content objects, the content objects may be ranked based on the score (STEP 732). This ranking may comprise ordering the content objects from lowest score to highest score or vice versa, or using some other ordering methodology. A set of the top ranked content objects may be selected (STEP 832), search results formulated according to this set of top ranked content object and the search results returned to the user (STEP 834).

Figure 13:
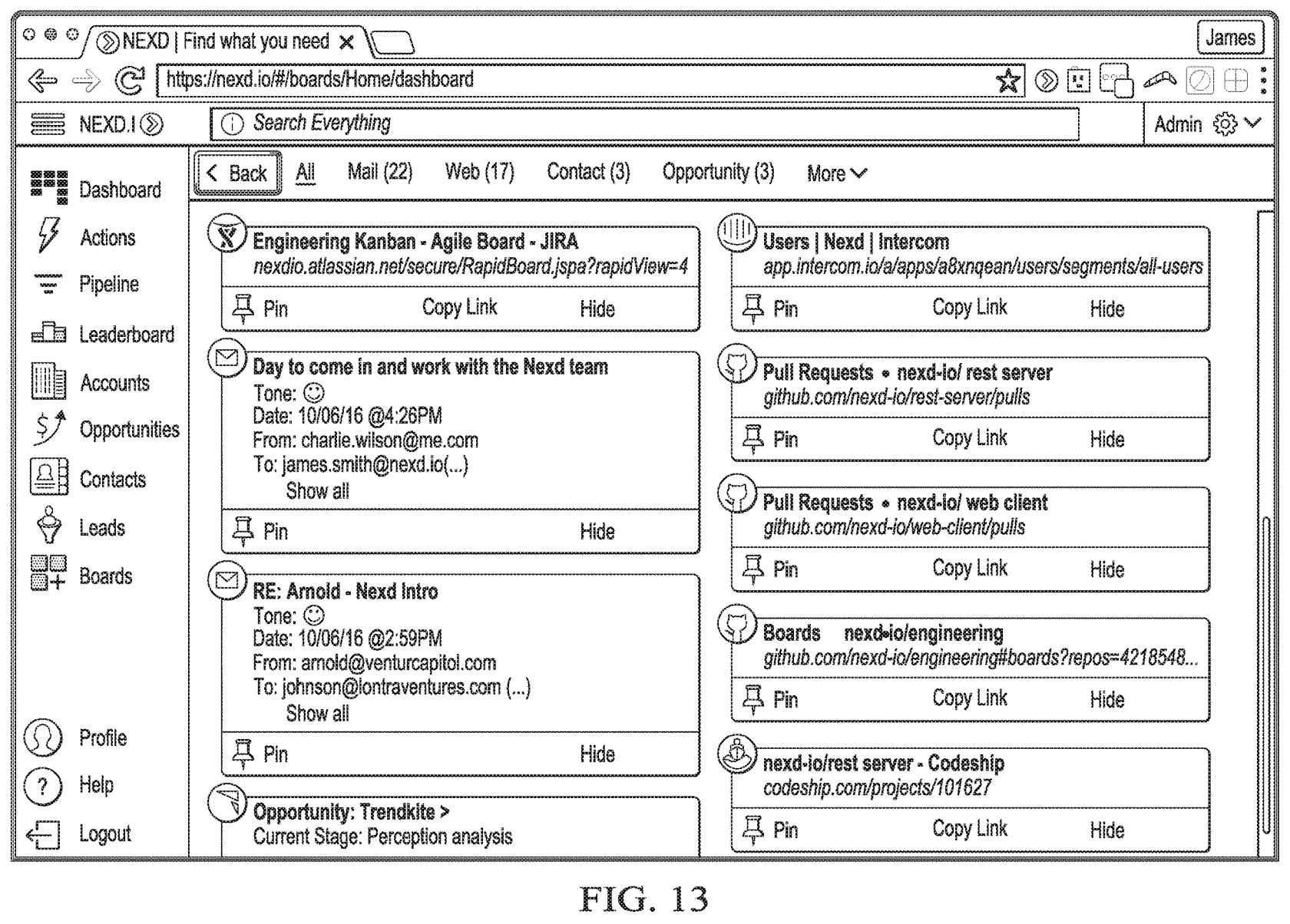

In particular, in one embodiment, the search module may select a number of the top ranked content object (e.g., the first ten or twenty of the ranked list of content objects) and obtain the URLs associated with those content objects. The URLs for the search results may be returned to the search interface where they are used in the formation of a search results interface that is returned to the user for presentation in the user's web browser. The URLs for the relevant content items can be returned to the user in these search results. The user who submitted the search can then directly access the relevant content items by interacting with the returned URL (e.g., clicking on a link) in the search results without any involvement of the search system. FIG. 13 depicts one embodiment of an interface presenting search results of a search system to a user.

Although the invention has been described with respect to specific embodiments thereof, these embodiments are merely illustrative, and not restrictive of the invention. Rather, the description is intended to describe illustrative embodiments, features and functions in order to allow a person of ordinary skill in the art to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a specifically configured computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device (s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and may include any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. In general, the functions of the invention can be achieved by any means as is known in the art. For example, distributed or networked systems, components and circuits can be used. In another example, communication or transfer (or otherwise moving from one place to another) of data may be wired, wireless, or by any other means.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein the meaning of "in" includes "in" and "on" unless the context clearly dictates otherwise.

APPENDIX A

```
{
    "name": "production",
    "url": "https://nexd.io/#/core/login",
    "webSocketUrl": "https://nexd.io",
    "domain": "nexd.io",
    "interval": 15000,
    "requestTimeout": 30000,
    "require http": "https",
    "logLevel": "warn",
    "feedUrl": "http://nexd.io/desktop/update",
    "searchSince": 6,
    "searchSinceUnit": "months",
    "searchDirectories": ["Desktop", "Downloads", "Documents", "Dropbox"],
    "filters": ["**/.*/**", "**/-$*", "**/node modules/**", "**/bower components/**"],
    "extensions": [".doc", ".docx", ".rtf", ".txt", ".text",
        ".xls", ".xlsx", ".xlsb", ".xlsm", ".xlstx",
        ".csv",
        ".ods", ".ots",
        ".pptx", ".ppt",
        ".key",
        ".odp", ".otp",
        ".gdoc", ".gslides", ".gsheet", ".gdraw",
        ".pdf",
        ".numbers", ".keynote", ".pages"
    ]
}
```

APPENDIX B

```
// User has viewed content
var hasUserViewedFilter = {
  "has_child": {
    "type": "Content-view",
    "min_children": 1,
    "filter": { "term": {"userId": userId}}
  }
};
var contentPermissionsFilter = {
  "and": [
    { "term": {"contentPolicy.indexLevel": "team"}},
    { "term": {"permissions.view": "everyone"}}
  ]
};
// Find content that matching the given content policy names
// and have met the reguiredUnigueUsers threshold.
var teamContentFilter;
if (contentPolicyNames && contentPolicyNames.length > 0) {
  var contentPolicyTerms = [ ];
  for (var i=0; i < contentPolicyNames.length; i++) {
```

APPENDIX B-continued

```
        contentPolicyTerms.push({ "term": {"contentPolicy.name":
contentPolicyNames[i]}});
      }
      teamContentFilter = {
        "or": [
          contentPermissionsFilter,
          {
            "and":
              { "term":
{"contentPolicy.hasReguiredUnigueUsers": "true"}},
              { "or": contentPolicyTerms}
            ]
          }
        ]
      };
    } else {
      teamContentFilter = contentPermissionsFilter;
    }
    // Build up the filters which could be 1 to 4 of them.
    var filters = [ ];
    if (teamContentFilter) {
      filters.push(teamContentFilter);
    }
    filters.push(hasUserViewedFilter);
    var eventAuthorization = (filters.length === 1) ?
      filters [0] :
      { "or": filters };
    // All these terms may true for the user to see content
    // Matches team content, and Content view events from the user or
    // on the given list of content policies, or Content pin events
for
    // the given boardId.
    var authzFilter = [
        {"term": { "teamId": teamId }},
        eventAuthorization
    ];
```

APPENDIX C

```
// Content and content events schema
  var contentSchema = {
    url: {
      type: String,
      required: true,
      index: "not_analyzed"
    },
    normalizedUrl: {
      type: String,
      required: false,
      index: "not_analyzed"
    },
    teamId: {
      type: String,
      required: true,
      index: "not_analyzed"
    },
    appId: {
      type: String,
      required: true,
      index: "not_analyzed"
    },
    appTitle: {
      type: String,
      required: false,
      analyzer: "domain_name"
    },
    globalAppId: {
      type: String,
      required: false,
      index: "not_analyzed"
    },
    appEvents: {
      type: String,
      required: true,
      index: "not_analyzed"
    },
    urlHostname: {
```

APPENDIX C-continued

```
      type: String,
      required: false,
      analyzer: "domain_name"
    },
    urlPathname: {
      type: String,
      required: false
    },
    urlHash: {
      type: String,
      required: false
    },
    contentTitle: {
      type: String,
      required: false
    },
    displayTitle: {
      type: String,
      required: false
    },
    contentDescription: {
      type: String,
      required: false
    },
    iconURL: {
      type: String,
      required: false,
      index: "not_analyzed"
    },
    externalId: {
      type: String,
      required: false,
      index: "not_analyzed"
    },
    integrationId: {
      type: String,
      required: false,
      index: "not_analyzed"
    },
    boardId: {
      type: String,
      required: true,
      index: "not_analyzed"
    },
    pinnedBoardIds: {
      type: Array,
      required: false
    },
    // Type of content for the app (ex. web, mail, attachment)
    contentType: {
      type: String,
      required: true,
      index: "not_analyzed"
    },
    contentPolicy: {
      title: {
        type: String,
        required: false
      },
      name: {
        type: String,
        index: "not_analyzed"
      },
      // disable, individual, or team
      indexLevel: {
        type: String,
        index: "not_analyzed"
      },
      // when set to 'disable', the app's content will not show up
in recommendations
      // unless it matches a search
      recommendations: {
        type: String,
        index: "not_analyzed"
      },
      sources: {
        type: Array,
        index: "not_analyzed"
      },
      uniqueUserIds: {
```

APPENDIX C-continued

```
      type: Array,
      required: false
    },
    // indicates that the content has achieved the unique
    // user threshold required by content policy
    hasRequiredUniqueUsers: {
      type: String,
      index: "not_analyzed"
    }
  },
  metrics: {
    eventCount: {
      type: 'long'
    },
    lastUpdated: {
      type: Date
    }
  },
  permissions: {
    view: {
      type: Array,
      required: false
    }
  },
  created: {
    type: Date,
    default: Date.now
  },
  firstEventDate: {
    type: Date
  },
  lastEventDate: {
    type: Date
  },
  previousContent: {
    type: String,
    index: "not_analyzed"
  },
  // Events have an eventType, parent, and eventDate implicitly
  // These events also track the content policy applicable to them
  _events: {
    view: {
      userId: { type: String, index: "not_analyzed" },
      personId: { type: String, index: "not_analyzed" },
      teamId: { type: String, index: "not_analyzed" },
      appId: { type: String, index: "not_analyzed" },
      contentPolicy: {
        name: {
          type: String,
          index: "not_analyzed"
        }
      },
      indexLevel: { type: String, index: "not_analyzed" },
      recommendations: { type: String, index: "not_analyzed" },
      // The source of this event (nexd-web-client, nexd-desktop-client)
      source: { type: String, index: "not_analyzed" }
    },
    update: {
      userId: { type: String, index: "not_analyzed" },
      personId: { type: String, index: "not_analyzed" },
      teamId: { type: String, index: "not_analyzed" },
      appId: { type: String, index: "not_analyzed" },
      contentPolicy: {
        name: {
          type: String,
          index: "not_analyzed"
        }
      },
      indexLevel: { type: String, index: "not_analyzed" },
      recommendations: { type: String, index: "not_analyzed" },
      // store updates
      propertyName: { type: String, index: "not_analyzed" },
      oldValue: { type: String, index: "not_analyzed" },
      newValue: { type: String, index: "not_analyzed" },
      // The source of this event (nexd-web-client, nexd-desktop-client)
      source: { type: String, index: "not_analyzed" }
    },
  },
};
```

APPENDIX D

```
var ONE_HOUR = 60 * 60 * 1000;
var ONE_DAY = ONE_HOUR * 24 ;
var ONE_WEEK = ONE_DAY * 7;
var ONE_MONTH = ONE_DAY * 30;
var hourStart = new Date(relevantDate.getTime( ) - ONE_HOUR).toISOString( );
var hourEnd = new Date(relevantDate.getTime( ) + ONE_HOUR).toISOString( );
var dayStart = new Date(relevantDate.getTime( ) - ONE_DAY).toISOString( );
var dayEnd = new Date(relevantDate.getTime( ) + ONE_DAY).toISOString( );
var weekStart = new Date(relevantDate.getTime( ) - ONE_WEEK).toISOString( );
var weekEnd = new Date(relevantDate.getTime( ) + ONE_WEEK).toISOString( );
var monthStart = new Date(relevantDate.getTime( ) - ONE_MONTH).toISOString( );
var monthEnd = new Date(relevantDate.getTime( ) + ONE_MONTH).toISOString( );
var dateRanges =
  { "range" : {"eventDate" : {"from" : hourStart, "to": hourEnd, boost: 50}}},
  { "range" : {"eventDate" : {"from" : dayStart, "to": dayEnd, boost: 30}}},
  { "range" : {"eventDate" : {"from" : weekStart, "to": weekEnd, boost: 10}}},
  { "range" : {"eventDate" : {"from" : monthStart, "to": monthEnd, boost: 3}}},
];
dateRanges.push.apply( [
  { "term" : {"teamId": { "value": teamId, boost: 4}}},
  { "term" : {"userId": { "value": userId, boost: 2}}}
] );
if (hasRelevantDate) {
  authzFilter.push({
    "or": [
      {
        "missing": { "field": "created" }
      },
      {
        "range": {
          "created": {
            "lt": relevantDate.toISOString( )
          }
        }
      }
    ]
  });
}
// Boost results based on all events in the team for authorized content. This
// will only change the ordering of the content authorized by the filters.
//
var beRelevantView = {
  "has_child": {
    "type": "Content-view",
    "min_children": 1,
    "score_mode": "sum",
    "query": {
      "bool": {
        "should": dateRanges
      }
    }
  }
};
var beRelevantUpdate = {
  "has_child": {
    "type": "Content-update",
    "min_children": 1,
    "score_mode": "sum",
    "query": {
```

APPENDIX D-continued

```
      "bool": {
        "should": dateRanges
      }
    }
  }
};
// These queries are combined with other query clauses
// and filters to create a Elasticsearch search json request
    if (orderBy === 'relevance') { // Run recommendations based on events
        mainQuery = {
          "bool" : {
            "should": [beRelevantView, beRelevantUpdate, bePinned, beClicked],
            "minimum_should_match" : 1
          }
        };
    }
// Which is then added to a main elasticsearch query.
    var search = {
      "query": {
        "filtered" : {
          "filter": mainFilter,
          "query": mainQuery
        }
      }
    };
```

What is claimed is:

1. A search system, comprising:
a server computer coupled to a plurality of user computer devices of a team over a network, the server computer including:
a data store including an event based search index;
a processor; and
a non-transitory computer readable medium comprising instructions executable on the processor for:
receiving an event from an agent resident on a user computing device, the event associated with a user interaction with a content item at the user computing device, wherein the content item is accessible by the user at a Uniform Resource locator (URL) included in the event;
storing, in the event based search index of the data store at the search system, an event object representing the event in association with a content object representing the content item, wherein the event object is associated with a user identifier for the user, the event object indicates an action type indicating a type of the user interaction with the content item, the content object includes the URL of the content item and the content object is associated with a team object representing the team associated with the user;
receiving a search from the user at the search system from the user at the user computing device;
accessing the event based search index to determine a set of content objects based on the search;
based on the determined set of content objects, determining at least one associated event objects stored in the event based search index, wherein each of the determined at least one associated event objects is associated with the user identifier for the user and one of the set of content objects;
determining a total score for each of the set of content objects based on the at least one associated event objects, wherein determining a total score for each of the set of content object comprises:
determining a first weighted score based on recency of user access for the content object;
determining a second weighted score based on recency of team access for the content object;
determining a third weighted score based on frequency of user access for the content object;
determining a fourth weighted score based on frequency of team access for the content object; and
combining the first, second, third, and fourth weighted scores to determine the total score;
ranking the set of content objects based on the total score associated with each content object, wherein ranking comprises ordering each total score from highest total score to lowest total score;
selecting a result set of content objects from the ranked set of content objects based on the ranking;
forming a search result to be presented to the user at the user computer, wherein the search result include the URLs for each of the result set of content objects; and
returning the search result to the user device.

2. The search system of claim 1, wherein the agent is a browser agent installed on a browser on the user's computing device, the browser agent receives a browser event from the browser when the user interacts with the content item at the URL, and the browser agent sends the event to the search system.

3. The search system of claim 2, wherein receiving the event comprises:
receiving a policy request from the agent, the policy request including a domain portion of the URL;
determining one or more policy objects associated with the team object in the data store based on the domain portion, each of the policy objects comprising a URL pattern for matching against the URL of the content item; and
returning the policy objects to the agent, wherein the agent evaluates the one or more policy objects to create the event.

4. The search system of claim 1, wherein the agent is an operating system agent installed on an operating system on the user's computing device, the operating system agent receives an operating system event from the operating system when the user interacts with the content item at the URL, and the operating system agent sends the event to the search system.

5. The search system of claim 4, wherein receiving the event comprises:
receiving a policy request from the agent, the policy request including a domain portion of the URL;
determining one or more policy objects associated with the team object based on the domain portion, each of the policy objects comprising a URL pattern for matching against the URL of the content item; and
returning the policy objects to the agent, wherein the agent evaluates the one or more policy objects to create the event.

6. The search system of claim 5, wherein the domain portion of the URL comprises a path or a folder.

7. The search system of claim 1, wherein the scoring each of the set of content objects based on the at least one associated event object includes scoring based on one or more of: frequency of user access, recency of user access, frequency of team access or recency of team access.

8. The search system of claim 7, wherein determining the set of content objects comprises determining the set of content objects associated with at least one event to which the user has access.

9. The search system of claim 1, wherein storing the event object representing the event comprises determining if the content object representing the content item is currently in the event based search index in association with the team object and, if not, creating the content object in the event based search index in association with the team object, wherein the content object includes the URL of the content item.

10. The search system of claim 1, wherein selecting the result set of content objects comprises selecting a predetermined number of highest ranking content objects.

11. A non-transitory computer readable medium, comprising:
instructions for executing on a server computer coupled to a plurality of user computer devices of a team over a network, the server computer including a data store including an event based search index and a processor for executing the instructions, the instructions executable for:
receiving an event from an agent resident on a user computing device at a search system, the event associated with a user interaction with a content item at the user computing device, wherein the content item is accessible by the user at a Uniform Resource Locator (URL) included in the event;
storing, in the event based search index of the data store, an event object representing the event in association with a content object representing the content item, wherein the event object is associated with a user identifier for the user, the event object indicates an action type indicating a type of the user interaction with the content item, the content object includes the URL of the content item and the content object is associated with a team object representing the team associated with the user;
receiving a search from the user at the search system at the user computing device;
accessing the event based search index to determine a set of content objects based on the search;
based on the determined set of content objects, determining at least one associated event objects stored in the event based search index, wherein each of the determined at least one associated event objects is associated with the user identifier for the user and one of the set of content objects;
determining a total score for each of the set of content objects based on the at least one associated event objects, wherein determining a total score for each of the set of content object comprises:
determining a first weighted score based on recency of user access for the content object;
determining a second weighted score based on recency of team access for the content object;
determining a third weighted score based on frequency of user access for the content object;
determining a fourth weighted score based on frequency of team access for the content object; and
combining the first, second, third, and fourth weighted scores to determine the total score;
ranking the set of content objects based on the score associated with each content object, wherein ranking comprises ordering each total score from highest total score to lowest total score;
selecting a result set of content objects from the ranked set of content objects based on the ranking;
forming a search result to be presented to the user at the user computer, wherein the search result include the URLs for each of the result set of content objects; and
retuning the search result to the user device.

12. The non-transitory computer readable medium of claim 11, wherein the agent is a browser agent Installed on a browser on the user's computing device, the browser agent receives a browser event from the browser when the user interacts with the content item at the URL, and the browser agent sends the event to the search system.

13. The non-transitory computer readable medium of claim 12, wherein receiving the event comprises:
receiving a policy request from the agent, the policy request including a domain portion of the URL;
determining one or more policy objects associated with the team object in the data store based on the domain portion, each of the policy objects comprising a URL pattern for matching against the URL of the content item; and
returning the policy objects to the agent, wherein the agent evaluates the policy object to create the event.

14. The non-transitory computer readable medium of claim 11, wherein the agent is an operating system agent installed on an operating system on the user's computing device, the operating system agent receives an operating system event from the operating system when the user interacts with the content item at the URL, and the operating system agent sends the event to the search system.

15. The non-transitory computer readable medium of claim 14, wherein receiving the event comprises:
receiving a policy request from the agent, the policy request including a domain portion of the URL;
determining one or more policy objects associated with the team object based on the domain portion, each of the policy objects comprising a URL pattern for matching against the URL of the content item; and
returning the policy objects to the agent, wherein the agent evaluates the policy object to create the event.

16. The non-transitory computer readable medium of claim 15, wherein the domain portion of the URL comprises a path or a folder.

17. The non-transitory computer readable medium of claim 11, wherein the scoring each of the set of content objects based on the at least one associated event object includes scoring based on one or more of: frequency of user access, recency of user access, frequency of team access or recency of team access.

18. The non-transitory computer readable medium of claim 17, wherein determining the set of content objects comprises determining the set of content objects associated with at least one event to which the user has access.

19. The non-transitory computer readable medium of claim 11, wherein storing the event object representing the event comprises determining if the content object representing the content item is currently in the event based search index in association with the team object and, if not, creating the content object in the event based search index in association with the team object, wherein the content object includes the URL of the content item.

20. The non-transitory computer readable medium of claim 11, wherein selecting the result set of content objects comprises selecting a predetermined number of highest ranking content objects.

\* \* \* \* \*